(12) United States Patent
Reddypalli et al.

(10) Patent No.: US 12,141,550 B2
(45) Date of Patent: Nov. 12, 2024

(54) INTELLIGENT AND DYNAMIC UPDATES TO GROUP OBJECTS BASED ON ATTRIBUTE VALUE CHANGE

(71) Applicant: People Center, Inc., San Francisco, CA (US)

(72) Inventors: Ruhitaj Reddypalli, San Francisco, CA (US); Bala Anjaneya Sri Harsha Tanguturi, Andhra Pradesh (IN); Ujjwal Shukla, Karnataka (IN); Runbai Ma, Long Island City, NY (US); Vardhman Singh, Karnataka (IN); Supreeth Mohan, Karnataka (IN); Anil Kumar Meena, Karnataka (IN); Achyuth Chandra Annakula, Telangana (IN); Dipesh Jayantilal Rambhiya, San Ramon, CA (US); Siddhartha Gunda, Milpitas, CA (US); Samuel David Gnesin, San Francisco, CA (US); Adam Vy Donovan, San Francisco, CA (US)

(73) Assignee: People Center, Inc., San Francisco, CA (US)

( * ) Notice: Subject to any disclaimer, the term of this patent is extended or adjusted under 35 U.S.C. 154(b) by 0 days.

(21) Appl. No.: 18/323,924

(22) Filed: May 25, 2023

(65) Prior Publication Data
US 2024/0160415 A1    May 16, 2024

(30) Foreign Application Priority Data
Nov. 14, 2022    (IN) .............................. 202221065252

(51) Int. Cl.
*G06F 8/30*    (2018.01)
*G06F 8/34*    (2018.01)

(52) U.S. Cl.
CPC ................ *G06F 8/315* (2013.01); *G06F 8/34* (2013.01)

(58) Field of Classification Search
CPC .................................. G06F 8/315; G06F 8/34
(Continued)

(56) References Cited

U.S. PATENT DOCUMENTS

| 7,546,633 B2 * | 6/2009 | Garg | ..................... G06F 21/629 |
| | | | 713/170 |
| 8,095,970 B2 * | 1/2012 | Irani | ................... G06F 21/6218 |
| | | | 726/21 |

(Continued)

OTHER PUBLICATIONS

Watt et al., "Database Design—2nd Edition", 2014, BCampus, Victoria, B.C., 153 pages. (Year: 2014).*

(Continued)

*Primary Examiner* — Ted T. Vo
(74) *Attorney, Agent, or Firm* — Dority & Manning, P.A.

(57) ABSTRACT

Systems, devices, computer-implemented methods, and tangible non-transitory computer-readable media that facilitate intelligent and dynamic updates to membership of group object(s) based on a change to an attribute value with respect to an entity associated with the group object(s). In an embodiment, a computing system can: create a first group object using an attribute value that can at least partly define membership of group member(s) of the first group object; generate a dependency mapping file that maps the attribute value to second group object(s) created using the attribute value; employ the dependency mapping file to identify the second group object(s) upon detection of a change to the attribute value with respect to an entity associated with the first group object and the second group object(s); and/or update membership of the first group object and the second group object(s) to reflect the change to the attribute value with respect to the entity.

18 Claims, 9 Drawing Sheets

(58) Field of Classification Search
USPC .................................. 717/106–109, 120–122
See application file for complete search history.

(56) References Cited

U.S. PATENT DOCUMENTS

| | | | |
|---|---|---|---|
| 8,825,711 B2* | 9/2014 | Chan | G06F 16/9024 707/798 |
| 10,503,736 B2* | 12/2019 | Tatavu | G06F 16/24553 |

OTHER PUBLICATIONS

Margaret Rouse, "Instantiate", 2021, Retrieved from https://www.techopedia.com, 2 pages. (Year: 2021).*

* cited by examiner

INTELLIGENT AND DYNAMIC UPDATES TO GROUP OBJECTS BASED ON ATTRIBUTE VALUE CHANGE

PRIORITY CLAIM

The present application is based on and claims priority to Indian Provisional Patent Application No. 202221065252, having a filing date of Nov. 12, 2022, which is incorporated by reference herein.

FIELD

The present disclosure generally relates to computer systems. More particularly, the present disclosure relates to intelligently and dynamically updating membership of one or more group objects based at least in part on a change to an attribute value with respect to an entity associated with the one or more group objects.

BACKGROUND

Organizations use different types of software applications and computing systems to manage processes and information across an enterprise. Generally, each different application and computing system provides specialized features, functionality, and operations directed toward a specific solution. However, different applications and systems usually operate in isolation without communicating with one another and maintain their own separate sets of organizational information (e.g., in the form of disparate or disjointed datasets).

As a result, organizational information related to different groups associated with an organization and/or entities (e.g., employees, devices, departments) associated with such groups often remains siloed and becomes inconsistent and inaccurate when one or more changes to the membership of such groups are not reflected across different applications and systems. Further, endless manual updates and numerous, bespoke software integrations usually are required to: maintain accuracy and consistency of the organizational information related to such different groups and/or the entities associated therewith; and support organizational processes with respect to such different groups and/or the entities associated therewith across various applications and systems. As such, existing systems fail to provide intuitive and user-friendly tools for generating data reports that accurately synthesize and summarize data associated with such different groups and/or the entities associated with such groups.

SUMMARY

Aspects and advantages of embodiments of the present disclosure will be set forth in part in the following description, or can be learned from the description, or can be learned through practice of the embodiments.

According to an example embodiment of the present disclosure, a computing system can include one or more processors. The computing system can further include one or more non-transitory computer-readable media that collectively store instructions that, when executed by the one or more processors, can cause the computing system to perform one or more operations. The one or more operations can include creating a first group object based at least in part on an attribute value that can at least partly define membership of one or more group members of the first group object. The one or more group members can each have the attribute value. The one or more operations can further include generating a dependency mapping file that maps the attribute value to one or more second group objects created based at least in part on the attribute value. The one or more operations can further include employing the dependency mapping file to identify the one or more second group objects based at least in part on detection of a change to the attribute value with respect to an entity associated with the first group object and the one or more second group objects. The one or more operations can further include updating membership of the first group object and the one or more second group objects to reflect the change to the attribute value with respect to the entity.

According to another example embodiment of the present disclosure, a computer-implemented method can include creating, by a computing system operatively coupled to one or more processors, a first group object based at least in part on an attribute value that can at least partly define membership of one or more group members of the first group object. The one or more group members can each have the attribute value. The computer-implemented method can further include generating, by the computing system, a dependency mapping file that maps the attribute value to one or more second group objects created based at least in part on the attribute value. The computer-implemented method can further include employing, by the computing system, the dependency mapping file to identify the one or more second group objects based at least in part on detection of a change to the attribute value with respect to an entity associated with the first group object and the one or more second group objects. The computer-implemented method can further include updating, by the computing system, membership of the first group object and the one or more second group objects to reflect the change to the attribute value with respect to the entity.

According to an example embodiment of the present disclosure, a computing system can include one or more processors. The computing system can further include one or more non-transitory computer-readable media that collectively store instructions that, when executed by the one or more processors, can cause the computing system to perform one or more operations. The one or more operations can include simulating a potential change to an attribute value with respect to a group member of a first group object created based at least in part on the attribute value. The one or more operations can further include determining, based at least in part on simulating the potential change to the attribute value with respect to the group member, one or more potential membership changes associated with the first group object and at least one second group object created based at least in part on the attribute value. The one or more operations can further include storing, in a temporary simulated outcome object, the one or more potential membership changes associated with the first group object and the at least one second group object. The one or more operations can further include outputting at least one of the temporary simulated outcome object or the one or more potential membership changes.

Other embodiments of the present disclosure are directed to various systems, apparatuses, non-transitory computer-readable media, computer-implemented methods, user interfaces, and/or devices that can facilitate intelligent and dynamic updates to membership of one or more group objects based at least in part on a change to an attribute value with respect to an entity associated with the one or more group objects.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
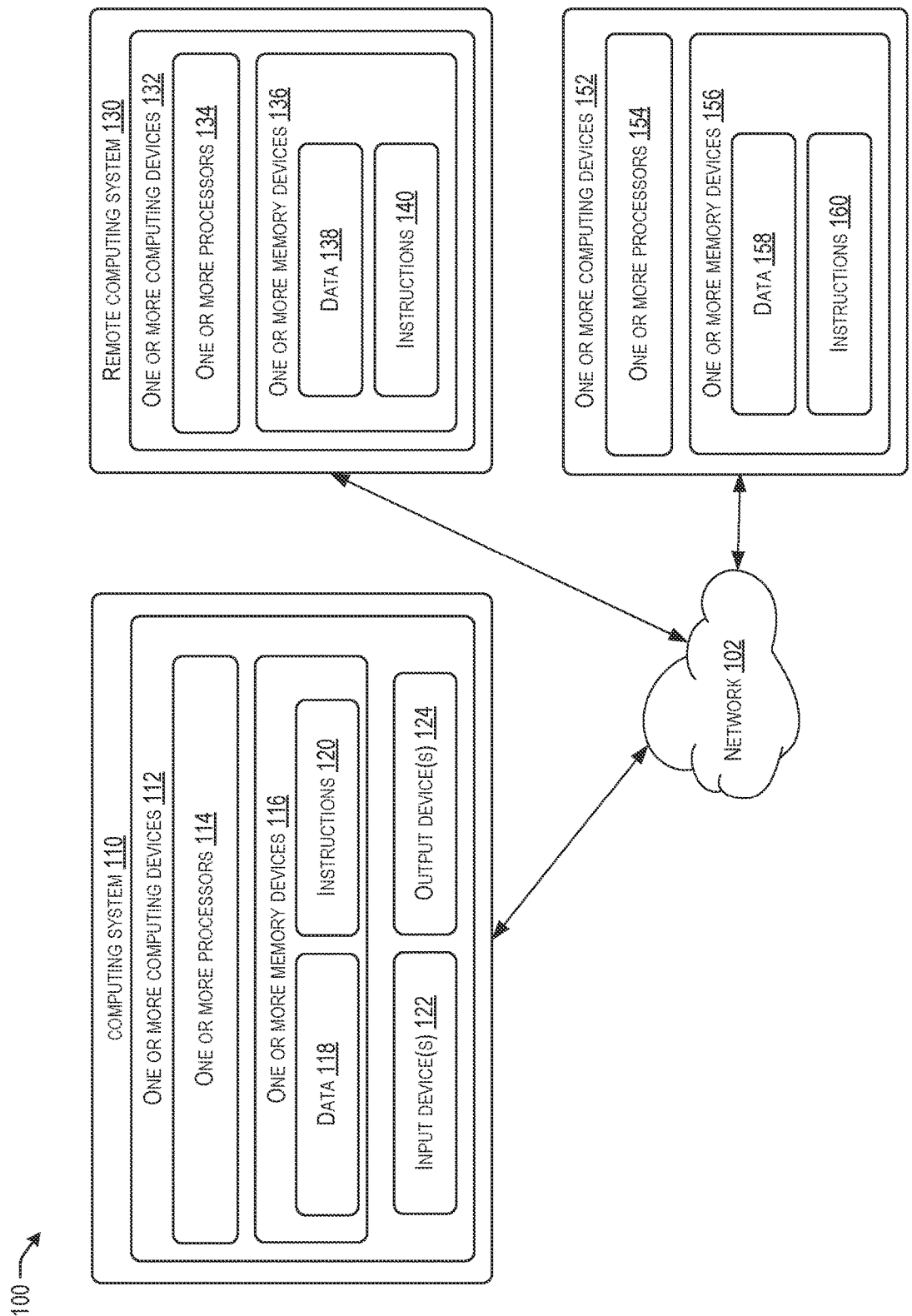
FIG. 1 depicts a block diagram of an example computing environment including a computing system that performs operations, according to example embodiments of the present disclosure.

Repeated use of reference characters and/or numerals in the present specification and/or figures is intended to represent the same or analogous features, elements, or operations of the present disclosure. Repeated description of reference characters and/or numerals that are repeated in the present specification is omitted for brevity.

DETAILED DESCRIPTION

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As referenced herein, the term "entity" refers to a human, a user, an end-user, a consumer, a computing device and/or program (e.g., a processor, computing hardware and/or software, an application), an agent, a machine learning (ML) and/or artificial intelligence (AI) algorithm, model, system, and/or application, and/or another type of entity that can implement and/or facilitate implementation of one or more embodiments of the present disclosure as described herein, illustrated in the accompanying drawings, and/or included in the appended claims. As referred to herein, the terms "includes" and "including" are intended to be inclusive in a manner similar to the term "comprising." As referenced herein, the terms "or" and "and/or" are generally intended to be inclusive, that is (i.e.), "A or B" or "A and/or B" are each intended to mean "A or B or both." As referred to herein, the terms "first," "second," "third," and so on, can be used interchangeably to distinguish one component or entity from another and are not intended to signify location, functionality, or importance of the individual components or entities. As referenced herein, the terms "couple," "couples," "coupled," and/or "coupling" refer to communicative coupling, electrical and/or electromagnetic coupling (e.g., capacitive coupling, inductive coupling, direct and/or connected coupling), mechanical coupling, operative coupling, optical coupling, and/or physical coupling.

The present disclosure is directed to a sophisticated, adaptive computing system or method for managing groups and their memberships based on changing attribute values. The proposed systems provide a number of technical effects and benefits. As one example, the proposed techniques enable dynamic modification of group memberships based on attribute values. This allows for automatic adjustment of groupings in response to changes in a member's attributes, which can save significant labor, time, and use of computational resources, particularly in large and complex organizations. As another example, the proposed techniques enable efficient dependency mapping. By generating a dependency mapping file that connects attribute values to specific groups, the system ensures a consistent and efficient mechanism to track changes and update group memberships accordingly. This can increase the accuracy of group memberships, reduce errors and enhance the performance of operations associated with these groups.

As another example technical effect and benefit, the system also allows for user interaction and permission management. It can present attribute values to users based on their permissions to view the related data. This enhances data security and confidentiality, and also provides a user-friendly interface for easier interaction with the system. As another example, the proposed techniques enable condition-based monitoring. For example, the proposed system can be capable of creating conditions based on the attribute value and monitoring any changes to these attributes. This feature increases the adaptability and responsiveness of the system. As another example, the proposed techniques enable temporary and/or permanent memory management. For example, the proposed system can include provides mechanisms for managing temporary and permanent memory by storing potential changes temporarily and implementing them permanently when instructed. This increases the reliability and control over the system operations.

Group Membership Updates Using Dependency Tracking

Example embodiments of the present disclosure are directed to a computing system that can be coupled to and/or implement (e.g., execute, run, monitor, manage, operate) an organizational management platform that controls and leverages one or more sets of organizational data to manage organizational applications (e.g., first-party applications, third-party applications) for one or more organizations (e.g., enterprise(s), non-profit organization(s)) that respectively correspond to the one or more sets of organizational data. More specifically, in example embodiments described herein, the computing system can facilitate intelligent and dynamic updates to the membership of different groups associated with such organization(s) across such organizational application(s) based at least in part on (e.g., in response to) a change to an attribute value with respect to an entity (e.g., employee, device, department, event) associated with such different groups. To identify such different groups whose membership is affected by such an attribute value change, the computing system can facilitate and/or perform one or more dependency tracking operations as described herein in accordance with one or more example embodiments.

In example embodiments of the present disclosure, each of the set(s) of organizational data can be structured, formatted, and/or function as an object graph having a plurality of objects (e.g., object instances of one or more classes) that can be created, defined, and/or implemented as described herein using, for instance, an object-oriented or object-based programming language and/or functionality (e.g., encapsulation, abstraction, polymorphism, inheritance). In these embodiments, the computing system can create, define, and/or implement any number of the plurality of objects as one or more group objects (e.g., group object instance(s) of one or more group classes) that can respectively correspond to, be associated with, and/or represent one or more groups (e.g., employees of a certain department, certain laptops running a certain operating system) that can be associated with an organization.

In the above embodiments, the computing system can create and/or define each of the group object(s) based at least in part on (e.g., using) one or more attribute values that can constitute and/or serve as the membership criterion or criteria of each of the group object(s), respectively. In these embodiments, each existing (e.g., current) group member and/or each incoming new group member of each group object can have (e.g., possess), correspond to, and/or be associated with the attribute value(s) used to create and/or define the group object. In these embodiments, the computing system can intelligently (e.g., automatically, without human intervention or input) and dynamically (e.g., approximately in real-time or near real-time) update the membership of any of such group object(s) based at least in part on (e.g., in response to) a change to any of such attribute value(s) with respect to an entity associated with the group object(s) such as, for example, an existing group member and/or an incoming new group member of the group object(s). To identify the group object(s) whose membership is affected by such an attribute value change, the computing system can facilitate and/or perform one or more dependency tracking operations as described herein in accordance with one or more example embodiments According to one or more embodiments of the present disclosure, the above-described computing system can include and/or be coupled (e.g., communicatively, operatively) to one or more computing devices that can each have one or more processors and/or one or more non-transitory computer-readable media. In one or more embodiments described herein, the one or more non-transitory computer-readable media can store instructions that, when executed by the one or more processors, can cause the one or more computing devices and/or the computing system to perform one or more operations. In these one or more embodiments, the one or more computing devices and/or the computing system can perform such one or more operations to facilitate intelligent and dynamic updates to membership of one or more group objects based at least in part on a change to an attribute value with respect to an entity associated with the one or more group objects. In at least one embodiment, such operation(s) can include one or more dependency tracking operations that can be facilitated and/or performed by the computing system and/or the one or more computing devices to identify one or more group objects whose membership is affected by the change to the attribute value.

In at least one embodiment of the present disclosure, the above-described computing system and/or computing device(s) can constitute and/or include, for instance, computing system 110, one or more computing devices 112, remote computing system 130, one or more computing devices 132, one or more computing devices 152, computing device 200, computing system 302, computing system 306, and/or computing system 310 described below with reference to the example embodiments depicted in FIGS. 1, 2, and 3. In this and/or other embodiments, computing system 110, remote computing system 130, computing device(s) 132, computing device(s) 152, computing device 200, and/or computing system 310 can perform the operation(s) described herein in accordance with example embodiments to facilitate intelligent and dynamic updates to membership of one or more group objects based at least in part on a change to an attribute value with respect to an entity associated with the one or more group objects.

In example embodiments of the present disclosure, to facilitate and/or perform one or more operations described herein in accordance with one or more embodiments, the above-described computing system (e.g., computing system 110) can respectively create (e.g., generate), define (e.g., populate with one or more attributes, attribute values, functions, methods, variables, data structures), and/or implement (e.g., execute, run, perform operation(s) on) one or more group classes and/or one or more group objects. In these embodiments, such group class(es) can constitute template(s) and/or blueprint(s) of one or more types and/or categories of group object(s). In these embodiments, such group object(s) can constitute group object instance(s) that can be generated by respectively instantiating such group class(es). In these embodiments, the computing system (e.g., computing system 110) can use an object-oriented or object-based programming language and/or functionality (e.g., encapsulation, abstraction, polymorphism, inheritance) to create and/or define such group class(es) and then respectively instantiate (e.g., execute, implement, run) the group class(es) to generate the group object(s). In example embodiments, the computing system can utilize such group class(es) and/or group object(s) in a variety of ways (e.g., by using an object-oriented or object-based programming language and/or functionality) to facilitate and/or perform one or more operations described herein in accordance with one or more embodiments of the present disclosure.

In example embodiments, the computing system (e.g., computing system 110) can create, define, and/or implement (e.g., perform operation(s) on) such group class(es) during build-time and/or compile-time. In some embodiments, the computing system can create, define, implement (e.g., perform operation(s) on), and/or store (e.g., save) such group class(es) in a permanent memory environment (e.g., a database, non-volatile memory).

In example embodiments, the computing system (e.g., computing system 110) can instantiate the group class(es) at runtime to respectively generate the group object(s) at runtime. As referenced herein, "at runtime" can be defined as occurring during the execution or running phase (e.g., the final phase) of a computer program's life cycle where the code of the program is executed by a processor. In example embodiments, the computing system can implement (e.g., execute, run, perform operation(s) on) the group object(s) at runtime. In some embodiments, the computing system can instantiate such group class(es) to respectively generate such group object(s) at runtime in a temporary memory environment (e.g., volatile memory, cache memory). In some embodiments, the computing system can store (e.g., save) and/or implement (e.g., execute, run, perform operation(s) on) such group object(s) at runtime in such a temporary memory environment (e.g., volatile memory, cache memory).

In example embodiments of the present disclosure, the computing system (e.g., computing system 110) can respectively create (e.g., by instantiating a group class) and/or define one or more group objects (e.g., group object instance(s)) based at least in part on (e.g., using) one or more attribute values (e.g., data value(s)) that respectively correspond to one or more entities (e.g., current group member(s), incoming new group member(s)) associated with the group object(s). For instance, in example embodiments, the computing system can create and/or define (e.g., using an object-oriented or object-based programming language and/or functionality (e.g., encapsulation, abstraction, polymorphism, inheritance) as described above) one or more group classes (e.g., template(s), blueprint(s)) such that each of the group class(es) includes one or more attributes (e.g., "department," "device," "location"). In these embodiments, the computing system can respectively instantiate (e.g., execute, implement, and/or run using an object-oriented or object-based programming language and/or functionality (e.g., encapsulation, abstraction, polymorphism, inheritance) as described above) such group class(es) to generate one or more group objects (e.g., instance(s) of the group class(es)) such that each of the group object(s) includes one or more attribute value fields that respectively correspond to the attribute(s) of the group class(es).

In the above embodiments, the computing system (e.g., computing system 110) can populate (e.g., using an object-oriented or object-based programming language and/or functionality (e.g., encapsulation, abstraction, polymorphism, inheritance)) each of the attribute value field(s) of each of the group object(s) by respectively writing one or more attribute values (e.g., "engineering department," "laptop," "Austin, Texas") into corresponding attribute value field(s) (e.g., "department," "device," "location"). In these embodiments, each of the attribute value(s) can therefore be used to respectively define (e.g., configure), at least partly, the group object(s) and/or to respectively define (e.g., specify), at least partly, the membership criterion or criteria for being a group member of each of the group object(s). For example, in these embodiments, each current group member and/or each incoming new group member of a group object can have (e.g., possess), correspond to, and/or be associated with each attribute value of the group object such that each attribute value of the group object is common to and/or shared by each current group member and/or each incoming new group member of the group object.

As described in example embodiments of the present disclosure, if any attribute value of a group object changes with respect to (e.g., as the change relates to) a current group member and/or an incoming new group member of the group object, the membership status of the current group member and/or the incoming new group member with respect to the group object can thereby change, which can affect the membership (e.g., number of group members) of the group object. For example, in one embodiment, an attribute value of the group object can be an "engineering department" attribute value and a current group member of the group object can be an employee that was working in the engineering department of an organization but has been recently transferred to a sales department of the organization. In this embodiment, such a transfer would change the "engineering department" attribute value to a "sales department" attribute value with respect to such a current group member, which would result in that current group member no longer being a group member of the group object. Therefore, in example embodiments described herein, any change to any attribute value of a group object with respect to (e.g., as the change relates to) any current group member and/or any incoming new group member of the group object can affect membership of the group object.

In example embodiments described herein, the attribute value(s) of a group object can correspond to any attribute of any entity and/or any aspect of and/or associated with such any entity (e.g., events, operations, activities, policies, and/or another aspect of and/or associated with an entity). For example, the attribute value(s) of a group object according to at least one non-limiting embodiment of the present disclosure can correspond to, but are not limited to, attribute(s) of: an organization (e.g., department of an organization, payroll, workflows, taxation obligations, benefits); an employee or other entity (e.g., contractor) associated with an organization (e.g., start date, exit date, role of an employee, salary, computing device(s) assigned to an employee, location, education level, personal characteristics); resource(s) of and/or associated with an organization (e.g., an organizational management platform implemented by a computing system of the organization, computing systems, computing devices, network or communication resources, first-party applications of the organization, third-party applications integrated into and/or used by a computing system of the organization, funds, lines of credit, physical or tangible resources, virtual resources); and/or an attribute of another entity and/or another aspect of and/or associated with such other entity.

In example embodiments of the present disclosure, each of the group object(s) described herein can correspond to and/or represent a certain group associated with a certain entity. For instance, in some embodiments, each of the group object(s) can correspond to and/or represent a certain group associated with an organization (e.g., an enterprise, company, non-profit organization).

By way of example, in one non-limiting embodiment, each of the group object(s) described above can correspond to and/or represent a group that can include, but is not limited to: a group of all employees currently working in an engineering department of an organization; a group of all survey participants providing the same survey response to a certain survey question; a group of laptops made before a certain date and running a certain operating system; a group of products and/or services marketed at a certain launch event; a group of employees having a certain relationship with another employee (e.g., peers of a certain employee, employees on the same organization chart level as a certain employee, team members managed by a certain manager); a group of all job postings for certain positions in a certain department at a certain location; a group of all job openings that have been approved for posting to the public but have not yet been publicly posted; a group of all job applications received but not reviewed for a certain position in a certain department at a certain location; and/or another group associated with an organization.

In example embodiments, each of the above-described group class(es) and/or group object(s) can include data (e.g., attribute(s), attribute value(s) of and/or corresponding to the attribute(s), list of current group members and/or current group member identifiers) and/or code (e.g., machine and/or computer-readable and/or executable instructions in the form of one or more procedures referred to as one or more "methods" or "functions"). For instance, in these embodiments, the computing system (e.g., computing system 110) can use an object-oriented or object-based programming language and/or object-oriented or object-based programming functionality and/or features (e.g., encapsulation, abstraction, polymorphism, inheritance) to create and/or define a group class such that it includes at least some of the data (e.g., attribute(s)) and/or code (e.g., method(s), function(s)) described above. Consequently, in these embodiments, when the computing system instantiates the group class to generate one or more group objects (e.g., instance(s) of the group class), each of such group object(s) can also include such data and/or code that can be included in the group class and/or data value(s) of and/or corresponding to such data (e.g., attribute value(s) of and/or corresponding to the attribute(s), a list of current group member(s) of the group object, a list of current group member identifier(s) respectively corresponding to the current group member(s) of the group object).

In the above embodiments, such data and/or code can constitute an interface that can specify how each of the group class(es) and/or the group object(s) can be respectively utilized in an object-oriented and/or object-based computing environment. In these embodiments, such code can be respectively executed (e.g., by a processor) to cause such group class(es) and/or group object(s) to respectively perform one or more operations on themselves (e.g., on their own data) and/or to respectively perform one or more operations on and/or with one or more other group classes and/or one or more other group objects (e.g., on and/or with their own data and/or the respective data of such other group class(es) and/or other group object(s)).

In some embodiments, the above-described code can include, constitute, take the form of, and/or be formatted as, for instance, at least one: function (e.g., routine(s), subroutine(s)); method (e.g., the behavior of group class(es) and/or group object(s), for example, how a group object can be utilized); variable (e.g., a named abstract storage location (e.g., a container) that stores one or more specific types of data and/or sets of bit(s) also referred to as "value(s)"); and/or data structure (e.g., data values, relationships between them, and operation(s) or function(s) that can be implemented on the data values). In these embodiments, such code can be respectively executed (e.g., by a processor coupled to the computing system) to cause such group class(es) and/or group object(s) to interact with and/or communicate with one another (e.g., access and/or share each other's data, perform operation(s) on and/or with each other). For example, each of the group class(es) and/or group object(s) can have a designated identifier (e.g., lexical token, pointer, an address of a storage location) that can be used by the group class(es) and/or group object(s) to identify, interact, and/or communicate with one another.

In some embodiments, the above-described code can include the dependency mapping file described below (e.g., in the form of a function and/or a configuration file) that can respectively map one or more attribute values to one or more group object(s) that have been at least partly defined using such attribute value(s) (e.g., that have been at least partly defined by respectively populating one or more attribute value fields in each of such group object(s) with such attribute values(s) to establish membership criteria(on)). In some embodiments, the above-described data can include the dependency mapping file described below (e.g., in the form of an index and/or a table such as, for instance, a look-up table).

In some embodiments, the above-described code can be executed to cause group class(es) and/or group object(s) to respectively update and/or refresh themselves (e.g., remove or add one or more current group members and/or one or more current group member identifiers (e.g., current group member name(s), lexical token(s), identification number(s)). For example, in some embodiments, such code can be executed to cause group class(es) and/or group object(s) to respectively perform such an update and/or refresh operation on themselves based at least in part on (e.g., in response to), for instance, receiving a data notification from the computing system (e.g., computing system 110), another group class, and/or another group object. In some embodiments, such a data notification can be indicative of a change that has occurred to at least one attribute value with respect to at least one current group member of at least one group class and/or group object. In some embodiments, such a data notification can be indicative of a change that has occurred to at least one attribute value with respect to at least one entity (e.g., an employee) that will become a group member of at least one group class and/or group object as a result of such an attribute value change with respect to the at least one entity.

In at least one embodiment described herein, the computing system (e.g., computing system 110) can create (e.g., by instantiating a group class as described above) and/or define (e.g., by populating one or more attribute value fields corresponding to one or more attributes) a first group object (e.g., a first group object instance) based at least in part on (e.g., using) one or more first attribute values such as, for instance, N attribute values (e.g., where "N" denotes a total quantity of the first attribute value(s)). In this embodiment, such N attribute values can be used to not only define (e.g., configure), at least partly, the first group object but can also be used to define (e.g., specify), at least partly, membership of all group members of the first group object. In other words, in this embodiment, the N attribute values can be used to not only define (e.g., configure), at least partly, the first group object but can also be used to define (e.g., specify), at least partly, one or more membership criterion or criteria for being a group member of the first group object (e.g., such that all group members of the first group object have (e.g., possess), correspond to, and/or are associated with each of the N attribute value(s)).

In some embodiments, such N attribute values, and/or any attribute value described in example embodiments of the present disclosure, can constitute and/or include any attribute value corresponding to any attribute of any entity and/or any aspect associated with, for instance, an organization (e.g., a company, enterprise, non-profit organization) and/or an organization management platform (e.g., an organization management platform described herein) that can be associated with the organization (e.g., implemented by a computing system of the organization). For instance, in non-limiting example embodiments described herein, such N attribute values, and/or any attribute value described in one or more non-limiting embodiments of the present disclosure, can correspond to any attribute of, for example: an employee (e.g., employee personal information, relationship between employees, hire date, current employment and/or role state and/or status); a device (e.g., laptop, phone); a department (e.g., engineering, sales, human resources, payroll); a team (e.g., department team); an event (e.g., hiring, public relations or social event, product or services launch); an activity (e.g., survey activity, reporting to a regulatory agency; department activity, employee activity, customer activity, activity associated with first-party application(s) and/or third-party application(s)); and/or another attribute associated with any entity and/or any aspect associated with an organization and/or an organization management platform associated with the organization.

In some embodiments, the computing system (e.g., computing system 110) can populate the first group object, and/or any group object described herein, with all the current group members of the first group object that each have (e.g., possess), correspond to, and/or are associated with each of the N attribute values used to create and/or define (e.g., at least partly) the first group object. For example, in one embodiment, the computing system can include (e.g., write) a list of such current group members in the first group object (e.g., a list of each current group member's name and/or identifier (e.g., lexical token, identification number)).

In some embodiments, to determine the current and/or incoming new group member(s) of the first group object, and/or any group object described herein, the computing system (e.g., computing system 110) can use, for example, an object-oriented or object-based programming language and/or functionality (e.g., encapsulation, abstraction, polymorphism, inheritance) to traverse (e.g., query, search) an object graph having a plurality of objects (e.g., a plurality of object instances) that respectively correspond to a plurality of entities (e.g., employees, devices, departments). In these embodiments, each object of the plurality of objects (e.g., each object instance of the plurality of object instances) can include one or more attribute values that correspond to an entity of the plurality of entities. In these embodiments, for each attribute value of the N attribute values, the computing system can implement an object-oriented or object-based programming language and/or functionality (e.g., encapsulation, abstraction, polymorphism, inheritance) to write and/or execute a query and/or search condition (e.g., a query language formula) that can be applied against the object graph (e.g., run and/or executed on the object graph) such that the query and/or search condition returns one or more entities that have (e.g., possess), correspond to, and/or are associated with each attribute value of the N attribute values.

In some embodiments, the computing system (e.g., computing system 110) can write and/or execute the above-described query and/or search condition (e.g., a query language formula) that can be applied against the object graph (e.g., run and/or executed on the object graph) such that the query and/or search condition returns one or more entities (e.g., newly hired employee(s) of an organization) that, as a result of a recent event (e.g., hiring of the new employee(s)), now have (e.g., now possess), now correspond to, and/or are now associated with at least one attribute value (e.g., of the N attribute values) used to create and/or define one or more group objects. In these embodiments, based at least in part on (e.g., in response to) such a recent event (e.g., hiring of the new employee(s)), such one or more entities (e.g., newly hired employee(s)) can thereafter become group member(s) of such group object(s). In example embodiments of the present disclosure, each of such one or more entities (e.g., each of the newly hired employee(s)) can therefore constitute and/or be referred to herein as an "incoming new group member" or a "soon to be new group member" of such group object(s).

In some embodiments, the computing system (e.g., computing system 110) can write and/or execute the above-described query and/or search condition (e.g., a query language formula) that can be applied against the object graph (e.g., run and/or executed on the object graph) such that the query and/or search condition returns one or more current and/or incoming new group members of a certain group object and/or a total quantity of such current and/or incoming new group members of a certain group object. For example, in one embodiment, the computing system can write and/or execute such a query and/or search condition (e.g., a query language formula) such that it returns: a list of all current and/or incoming new group member(s) of a certain group object (e.g., a list of all the names of the current and/or incoming new group member(s)); a list of current and/or incoming new group member identifier(s) respectively corresponding to all current and/or incoming new group member(s) of a certain group object; and/or the total number of all current and/or incoming new group members of a certain group object.

In example embodiments of the present disclosure, the computing system (e.g., computing system 110) can generate (e.g., create, define, specify, configure) a dependency mapping file that respectively maps (e.g., associates) each of the N attribute values to one or more second group objects that were created (e.g., generated from instantiating a group class as described above) and/or defined (e.g., configured) based at least in part on (e.g., using) at least one attribute value of the N attribute values. In these embodiments, as the second group object(s) were created and/or defined based at least in part on (e.g., using) at least one attribute value of the N attribute values, the second group object(s) would therefore be affected by a change to the at least one attribute value of the N attribute values that occurs with respect to an entity associated with the first group object (e.g., a current and/or incoming new group member of the first group object). In multiple embodiments, based at least in part on (e.g., in response to) detecting, with respect to such an entity associated with the first group object, a change to the at least one attribute value of the N attribute values, the computing system can employ (e.g., reference, access, analyze, read, execute, implement, run) such a dependency mapping file to identify the second group object(s) that were created and/or defined based at least in part on (e.g., using) the at least one attribute value of the N attribute values.

In example embodiments described herein, the change to and/or associated with the at least one attribute value of the N attribute values with respect to such an entity associated with the first group object (e.g., a current and/or incoming new group member of the first group object) can affect the membership of the one or more second group objects that were created and/or defined based at least in part on (e.g., using) the at least one attribute value of the N attribute values. For example, in embodiments where the first group object is created and/or defined (e.g., configured) using a first attribute value (e.g., of the N attribute values) that is common to (e.g., shared by, corresponds to, associated with) all current and/or incoming new group members of the first group object and a second group object of the one or more second group objects is created and/or defined (e.g., configured) using the first attribute value and a second attribute value (e.g., of the N attribute values) that are each common to (e.g., shared by, correspond to) all current and/or incoming new group members of the second group object, a change to the first attribute value with respect to a particular group member that is a current group member of both the first group object and the second group object would affect the membership of both the first group object and the second group object. In example embodiments, the first and/or second attribute value described above can each constitute an attribute value of the N attribute values.

Specifically, in the above embodiments, a change to the first attribute value as it relates to such a particular group member that is a member of both the first group object and the second group object would affect (e.g., alter) that group member's membership status in both the first group object and the second group object, which would affect (e.g., alter, reduce) the membership (e.g., overall, total membership) of both the first group object and the second group object. For instance, in an example embodiment, the first attribute value can include and/or constitute an "engineering department" attribute value and the group member can be an employee currently working in the engineering department of an organization. In this embodiment, if the group member were to be transferred to, for instance, a sales department of the organization, the first attribute value with respect to (e.g., as it relates to) the group member would change to, a "sales department" attribute value. Consequently, in this embodiment, such a transfer and change of the first attribute value with respect to the group member would affect (e.g., alter) the membership status of the group member in both the first group object and the second group object.

For example, in the above embodiments, as a result of the transfer to the sales department, the group member would no longer be a member of either the first group object or the second group object. Instead, in these embodiments, as a result of the transfer to the sales department, the group member could thereafter become a member of a third group object that was created and/or defined (e.g., configured) based at least in part on (e.g., using) the "sales department" attribute value. In the above embodiments, as such a transfer to the sales department would affect (e.g., alter) the membership status of the group member in both the first group object and the second group object, it would thereby also affect (e.g., alter, reduce) the membership (e.g., overall, total membership) of both the first group object and the second group object.

In embodiments where the group member becomes a member of the third group object (e.g., that was created and/or defined using the "sales department" attribute value) as a result of the transfer to the sales department, such a transfer would affect (e.g., alter) the membership of the group member with respect to the third group object (e.g., the group member would become a new group member of the third group object as a result of the transfer to the sales department). In these embodiments, as such a transfer to the sales department would affect (e.g., alter) the membership of the group member with respect to the third group object, it would thereby also affect (e.g., alter, increase) the membership (e.g., overall, total membership) of the third group object.

In some embodiments, the above-described dependency mapping file can include and/or constitute, for instance, a table (e.g., a look-up table), an index, a configuration file, and/or another type of mapping file. In example embodiments, the dependency mapping file can be used to define (e.g., specify), store, and/or determine the relationships, associations, and/or dependencies between various group objects, various attributes and/or attribute values (e.g., including the N attribute values described above) used to create and/or define (e.g., configure) the group objects, and/or various group members of the group objects (e.g., existing group members, incoming new group members (e.g., recent new hire employees)).

In some embodiments, the above-described dependency mapping file can include and/or constitute, for instance, a configuration file. In these embodiments, the configuration file can include and/or constitute, for instance, a machine and/or computer-readable and/or executable programming component that can be executed using a processor. For example, in these embodiments, the configuration file can include and/or constitute a script of code (e.g., a routine, a subroutine, one or more lines of code, processing threads, instructions), a software module, a workflow, a function, an algorithm (e.g., a dependency tracking algorithm), and/or another machine and/or computer-readable and/or executable programming component that can be executed using a processor to determine the relationships, associations, and/or dependencies between one or more group objects, one or more attributes and/or attribute values (e.g., including the N attribute values described above) used to create and/or define (e.g., configure) such group object(s), and/or one or more group members of the group objects (e.g., existing group members, incoming new group members (e.g., recent new hire employees)). In some embodiments where the dependency mapping file can include and/or constitute the above-described configuration file, such a configuration file can be generated (e.g., written by the computing system) and/or implemented (e.g., executed and/or run by the computing system and/or one or more group objects) using, for instance, an object-oriented or object-based programming language and/or functionality (e.g., encapsulation, abstraction, polymorphism, inheritance).

In at least one embodiment, the computing system (e.g., computing system 110) can store the above-described dependency mapping file in a class (e.g., an object class) and/or an instance of the class (e.g., an object instance of an object class). In this and/or another embodiment, the computing system can store an identifier corresponding to the dependency mapping file (e.g., a pointer, a register and/or storage location address where the dependency mapping file is stored) in a class (e.g., an object class) and/or an instance of the class (e.g., an object instance of an object class). For example, in one embodiment, the computing system can create and/or define the above-described group class(es) and/or group object(s) such that each includes the dependency mapping file and/or the identifier corresponding to the dependency mapping file described above. In one embodiment, the computing system can create and/or define the above-described group class(es) and/or group object(s) such that the above-described data that can be included in each group class and/or group object can include the dependency mapping file (e.g., in the form of an index and/or a look-up table) and/or the identifier for the dependency mapping file described above. In another embodiment, the computing system can create and/or define the above-described group class(es) and/or group object(s) such that the above-described code that can be included in each group class and/or group object can include the dependency mapping file (e.g., in the form of a function and/or a configuration file) and/or the identifier for the dependency mapping file described above.

In at least one embodiment, to detect a change to an attribute value (e.g., the first and/or second attribute value of the N attribute values described above) with respect to a current and/or incoming new group member of a group object (e.g., the group member of the first and second group objects described above) that has been created and/or defined based at least in part on (e.g., using) the attribute value, the computing system (e.g., computing system 110) can monitor activity associated with an organization (e.g., an enterprise, company, non-profit organization) and/or an organizational management platform (e.g., the organizational management platform described herein) associated with the organization. For example, in multiple embodiments, the computing system can monitor (e.g., continuously without interruption or periodically) activity associated with any attribute values associated with any entity and/or any aspect associated with an organizational management platform of an organization (e.g., attribute value(s) associated with employees, departments, systems, devices, teams, events, activities, applications (e.g., first-party application(s) of the organizational management platform, third-party application(s) integrated into the organizational management platform)). In one example embodiment, the computing system can monitor activity associated with, for instance, computing environment 100, computing device 200, and/or computing environment 300 described below and illustrated in the example embodiments depicted in FIGS. 1, 2, and 3.

In example embodiments of the present disclosure, when the computing system (e.g., computing system 110) detects a change to an attribute value with respect to a current and/or incoming new group member of a group object that has been created and/or defined based at least in part on (e.g., using) the attribute value, the computing system can employ (e.g., reference, access, analyze, read, execute, implement, run) the dependency mapping file to identify one or more group objects affected by the change to the attribute value with respect to the current and/or incoming new group member. For example, the computing system can employ the dependency mapping file to identify: the first group object described above that was created and/or defined based at least in part on (e.g., using) the first attribute value of the N attribute values described above; and/or the second group object described above that was created and/or defined based at least in part on (e.g., using) the first attribute value and the second attribute values of the N attribute values.

In some example embodiments of the present disclosure, the computing system (e.g., computing system 110) can detect a change to an attribute value as it relates to an entity that is not a member of any group object. For instance, in some embodiments, when a new employee is hired by an organization to work in an engineering department of the organization, the new employee can thereafter have (e.g., possess), correspond to, and/or be associated with one or more attribute values as a result of being a newly hired employee (e.g., where the hiring of the new employee can cause one or more changes to one or more attribute values with respect to the new employee). For example, in one embodiment, as a result of being a newly hired employee of the engineering department, the new employee can thereafter have (e.g., possess), correspond to, and/or be associated with, for instance, a "new hire employee" attribute value and/or an "engineering department" attribute value. In example embodiments, based at least in part on (e.g., in response to) detecting that the new employee has been hired by the organization as a new employee of the engineering department, the computing system can determine that the new employee now has (e.g., possesses), corresponds to, and/or is associated with the "new hire employee" attribute value and/or the "engineering department" attribute value.

In the above embodiments, based at least in part on (e.g., in response to) determining that the new employee now has (e.g., now possesses), now corresponds to, and/or is now associated with the "new hire employee" attribute value and/or the "engineering department" attribute value as a result of being a newly hired employee of the engineering department, the computing system (e.g., computing system 110) can employ (e.g., reference, access, analyze, read, execute, implement, run) the above-described dependency mapping file to identify one or more group objects (e.g., a "new employee" group object, an "engineering department" group object) that have been created and/or defined based at least in part on (e.g., using) the "new hire employee" attribute value and/or the "engineering department" attribute value. In these embodiments, as such group object(s) have been created and/or defined based at least in part on (e.g., using) the "new hire employee" attribute value and/or the "engineering department" attribute value, the membership of such group object(s) will be affected as a result of the new employee being hired to work in the engineering department. For instance, in some embodiments, as a result of being hired as a new employee of the engineering department, the new employee could thereafter be added to, for example, a "new employee" group object and/or an "engineering department" group object, which would thereby affect the membership of such group objects if the new employee were added as a group member.

In example embodiments described herein, based at least in part on (e.g., in response to) identifying one or more group objects (e.g., the first, second, and/or third group object described above) that are affected by a change to an attribute value (e.g., the first and/or second attribute value of the N attribute values described above) with respect to a current and/or incoming new group member of the group object(s), the computing system (e.g., computing system 110) can facilitate and/or perform one or more operations to update and/or refresh the membership of such affected group object(s). For example, in some embodiments, the above-described code that can be included in group class(es) and/or group object(s) can include one or more update and/or refresh operations (e.g., subroutines, machine and/or computer readable and/or executable instructions) that can be executed (e.g., using a processor) to update and/or refresh the membership of one or more affected group objects (e.g., the first, second, and/or third group objects described above).

In the above embodiments, each of such affected group object(s) can execute (e.g., using a processor) such code to respectively update and/or refresh themselves (e.g., remove or add one or more current and/or incoming new group members and/or one or more current and/or incoming new group member identifiers (e.g., name(s), lexical token(s), identification number(s)), which can constitute updating and/or refreshing the affected group object(s) and/or the membership thereof. For example, in some embodiments, each of such affected group object(s) can execute such code to respectively update and/or refresh themselves based at least in part on (e.g., in response to), for instance, receiving a data notification from the computing system (e.g., computing system 110) and/or another group object (e.g., the first, second, and/or third group object described above). In at least one embodiment, each of the affected group object(s) can respectively receive such a data notification, execute such code, and/or update and/or refresh themselves as described above by using, for instance, an object-oriented or object-based programming language and/or functionality (e.g., encapsulation, abstraction, polymorphism, inheritance).

In some embodiments, the above-described data notification can be indicative of a change that has occurred to at least one attribute value (e.g., the first and/or second attribute value described above) with respect to at least one current and/or incoming new group member (e.g., the group member of the first and second group object described above) of at least one group object (e.g., the first and/or second group object described above). In some embodiments, such a data notification can be indicative of a change that has occurred to at least one attribute value (e.g., the "new hire employee" attribute value and/or the "engineering department" attribute value) with respect to at least one entity (e.g., the newly hired employee of the engineering department described above) that will become a group member of at least one group object (e.g., the "new employee" group object and/or the "engineering department" group object described above) as a result of such an attribute value change with respect to the at least one entity.

In example embodiments of the present disclosure, the computing system (e.g., computing system 110) can create and/or define (e.g., using object-oriented or object-based programming language and/or functionality as described herein) any one of the group objects described herein (e.g., the first, second, and/or third group object described above) based at least in part on (e.g., using) one or more attribute values that are common to and/or shared by each current and/or incoming new group member of the group object. In these embodiments, the computing system can also create and/or define (e.g., using object-oriented or object-based programming language and/or functionality) a condition and/or rule (e.g., condition statement or expression, "IF/THEN" statement or expression) that can include the attribute value(s) such that the condition and/or rule depends on the attribute value(s) and/or any change to any of such attribute value(s) with respect to any current and/or incoming new group member of the group object.

In the above embodiments, when the computing system (e.g., computing system 110) detects a change to any of such attribute value(s) with respect to any current and/or incoming new group member of the group object, the computing system can, in accordance with the condition and/or rule, analyze (e.g., read) and/or implement (e.g., execute, run) the above-described dependency mapping file to identify one or more group objects that are affected by the change (e.g., group object(s) whose membership is affected by the change). In some embodiments, based at least in part on (e.g., in response to) identifying such affected group object(s), the computing system can facilitate and/or perform the above-described update and/or refresh operation(s) with respect to each of the affected group object(s) based at least in part on (e.g., in response to) detecting the change (e.g., the computing system can add and/or remove current and/or incoming new group member(s) to and/or from the affected group object(s) to reflect the detected change). In some embodiments, for example, as described above, the computing system can cause each of the affected group object(s) to update and/or refresh themselves based at least in part on (e.g., in response to) detection of the change (e.g., the computing system can notify at least one of the affected object(s) of the change and such affected object(s) can add and/or remove current and/or incoming new group member(s) to reflect the detected change).

First-Party and/or Third-Party Application(s)

Example embodiments of the present disclosure are further directed to a computing system (e.g., computing system 110) that can notify a first-party application and/or a third-party application of a change to membership of affected group object(s) with respect to one or more current group members and/or one or more incoming new group members of the affected group object(s). In these embodiments, based at least in part on (e.g., in response to) receiving the above-described notification from the computing system, the first and/or third-party application can perform one or more operations to implement such a change with respect to (e.g., as it relates to) the first and/or third-party application, the current group member(s) of the affected group object(s), and/or the incoming new group member(s) of the affected group object(s). In these embodiments, the computing system can thereby facilitate propagation of such a change to membership of the affected group object(s) to the first and/or third-party application, which can constitute and/or be considered as "pushing" an update(s) to the first and/or third-party application. As an example, in embodiments where the first and/or third-party application is, for instance, a first and/or third-party e-mail application, the first and/or third-party e-mail application can respectively create and activate a new e-mail account for an incoming new group member of the affected group object(s) or deactivate an existing e-mail account of a current group member of the affected group object(s).

In some embodiments, a change can occur in, with respect to, and/or be associated with the first and/or third-party application and the change can affect (e.g., alter) membership of one or more current and/or incoming new group members of one or more group objects (e.g., the change can alter an attribute value with respect to the current and/or incoming new group member(s) where the attribute value was used to define the group object(s) at least partly). In these embodiments, the first and/or third-party application can perform one or more operations to implement such a change with respect to (e.g., as it relates to) the first and/or third-party application and the current and/or incoming new group member(s) of the group object(s) affected by the change. As an example, in embodiments where the first and/or third-party application is, for instance, a first and/or third-party e-mail application, a change that can occur in, with respect to, and/or be associated with the first and/or third-party application that can affect (e.g., alter) membership of the current group member(s) of the group object(s) can be the deactivation of an e-mail account of the current group member(s). In these embodiments, the first and/or third-party application can implement such a deactivation and/or terminate the e-mail account with respect to the current group member(s) and the first and/or third-party application.

In the above embodiments, the first and/or third-party application can also notify the computing system (e.g., computing system 110) of such a change and/or any update(s) completed (e.g., deactivation and/or termination of the e-mail account) by the first and/or third-party application with respect to the current and/or incoming new group member(s). In these embodiments, based at least in part on (e.g., in response to) receiving such a notification from the first and/or third-party application, the computing system can employ the above-described dependency mapping file to identity and/or update membership of the group object(s) affected by such a change. In these embodiments, the computing system can therefore "pull" any change(s) and/or update(s) that affect (e.g., alter) membership of the group object(s) from the first and/or third-party application when such change(s) and/or update(s) occur in, with respect to, and/or are associated with the first and/or third-party application.

In some embodiments, the computing system (e.g., computing system 110) can create and/or define (e.g., using object-oriented or object-based programming language and/or functionality) a condition and/or rule (e.g., condition statement or expression, "IF/THEN" statement or expression) that can trigger one or more operations (e.g., implement a workflow, "push" and/or "pull" operation(s)) associated with a first-party application and/or a third-party application, where such operation(s) can be performed on, with respect to, on behalf of, and/or otherwise be associated with one or more group objects based at least in part on (e.g., in response) to detecting the occurrence of a certain event. By way of example, in one embodiment, the computing system can create, define, and/or implement a "new employee" group object and further create and/or define a condition such that when a new employee is hired by an organization, the condition can trigger the new employee being added to the "new employee" group object (e.g., by the "new employee" group object) and/or the scheduling (e.g., by the "new employee" group object) of a calendar event (e.g., a meeting with the new employee and the manager of the new employee) in, for example, a first and/or third-party application.

In another example embodiment, the computing system (e.g., computing system 110) can create and/or define the above-described condition such that when one or more new employees are hired by an organization, the condition can trigger the computing system to create, define, and/or implement (e.g., instantiate) a "new employee" group class to produce a "new employee" group object. In this embodiment, the computing system can further create and/or define the condition such that, upon hiring, the new employee(s) are added to the "new employee" group object (e.g., by the "new employee" group object), which can then facilitate and/or perform one or more operations (e.g., implement a workflow, "push" and/or "pull" operation(s)) associated with the onboarding of such new employee(s).

For instance, in the above embodiment, the computing system (e.g., computing system 110) can create and/or define the condition such that upon hiring of the new employee(s), the "new employee" group object can: respectively create or cause the creation of (e.g., by a first and/or third-party application) a new e-mail account (e.g., a first and/or third-party e-mail account) for each of the new employee(s); create and/or implement or cause the creation and/or implementation of (e.g., by a first and/or third-party application) one or more new channels (e.g., a new first and/or third-party application, applet, add-on) for each of the new employee(s); communicate the hiring of the new employee(s) to another group object(s) that can then add the new employee(s) as a member(s) of such other group object(s) based on at least one attribute value that was used to at least partly define such other group object(s) and that respectively corresponds to the new employee(s); and/or perform or cause the performance of (e.g., by a first and/or third-party application) another operation (e.g., implement a workflow, "push" and/or "pull" operation(s)) to facilitate the onboarding of the new employee(s) to the organization.

Group Object Based on Employment and/or Role State and/or Status

Example embodiments of the present disclosure are further directed to a computing system (e.g., computing system 110) that can create and/or define (e.g., using object-oriented or object-based programming language and/or functionality as described herein) a group object based at least in part on the current employment and/or role state and/or status of an entity (e.g., an employee) associated with an organization. For instance, in these embodiments, the computing system (e.g., computing system 110) can create and/or define a group object based at least in part on one or more employment and/or role states and/or statuses that can include, but are not limited to: new hire employees that have been hired by an organization but have yet to start working for the organization (e.g., employees that are to begin working in an organization within a certain amount of time (e.g., within 1 week)); relatively new employees that have been working in the organization for a certain amount time (e.g., 1 month)); active employees (e.g., currently employed by an organization); active employees that will exit an organization within a certain amount of time (e.g., employees that will retire or have given notice to exit the organization within, for instance, 1 month); former employees (e.g., employees that are no longer employed by an organization); employees on short-term and/or long-term leave (e.g., employee(s) on sabbatical, family leave, medical and/or short-term disability leave); and/or another employment and/or role state and/or status.

By way of example, in one embodiment, the computing system (e.g., computing system 110) can create and/or define a "new hire employee—Austin, Texas" group object based at least in part on an employment and/or role state and/or status that can include, for instance, new hire employees of an organization that will be working (e.g., within 1 week) in an office located in Austin, Texas (TX). In this embodiment, based at least in part on (e.g., in response to) detecting that one or more new hire employees have been hired by the organization and/or have been added to the "new hire employee" group object, the computing system can send a notification (e.g., an e-mail notification including one or more company policies) only to such new hire employee(s) that will be working in the Austin, TX office of the organization (e.g., as opposed to sending the notification to all currently active employees already working in the Austin, TX office).

User Defined Attribute Values)/Condition(s)

Example embodiments of the present disclosure are further directed to a computing system (e.g., computing system 110) that can create (e.g., using object-oriented or object-based programming language and/or functionality as described herein) a group object based at least in part on one or more attribute values that can be defined by a user using a query language formula. In these embodiments, the user can write their own query language formula into an input element (e.g., an input data field, a command line) of a user interface (e.g., a GUI) that can be generated by and/or coupled to the computing system to define one or more attribute values that can then be used by the computing system to create a certain group object based at least in part on such attribute value(s).

In some embodiments, the user can further write their own query language formula into such an input element of such a user interface that can be generated by and/or coupled to the computing system (e.g., computing system 110) to define one or more conditions (e.g., "IF/THEN" statement(s)) or expression(s) and/or one or more triggers (e.g., certain event(s) that, when detected, trigger certain operation(s)) that can be associated with the group object, the attribute value(s), and/or one or more current and/or incoming new group member(s) of the group object. In these embodiments, based at least in part on (e.g., in response to) detecting the occurrence of such trigger(s), the computing system can implement (e.g., execute, run) such condition(s) to perform and/or facilitate (e.g., cause execution of) one or more operations (e.g., workflow(s)) such as, for instance, the group object membership update and/or refresh operation(s) described above.

Permissions-Based Safeguarding of Attribute Value(s)

Example embodiments of the present disclosure are further directed to a computing system (e.g., computing system 110) that can provide permissions-based safeguarding of any attribute value(s) that can only be viewed and/or accessed by certain users. For example, in embodiments where the computing system creates and/or defines a group object based at least in part on (e.g., using) one or more attribute values defined by a user, when the user is viewing and/or selecting (e.g., via a GUI) such attribute value(s), the computing system can prevent the user from viewing and/or selecting one or more certain attribute values that respectively correspond to data that the user does not have permission (e.g., access or privilege rights) to view (e.g., data that the user does not have permission to view in a permanent memory environment and/or database coupled to the computing system). In these embodiments, such attribute value(s), if used to create and/or at least partly define a group object, would involve the computing system returning certain data (e.g., data value(s)) that the user does not have permission to view. As such, in these embodiments, the computing system can safeguard such attribute value(s) and/or corresponding data the user does not have permission to view by preventing the user from viewing and/or selecting (e.g., in a GUI) any of such attribute value(s). In these embodiments, if the computing system determines that the user does have permission (e.g., access or privilege rights) to view certain data (e.g., data value(s)) corresponding to one or more certain attribute values, the computing system can present (e.g., display, render in a GUI) such attribute value(s) to the user for selection to create and/or define the group object based at least in part on one or more of such attribute value(s) that can be selected by the user.

In some embodiments, to facilitate the above-described permissions-based safeguarding of such attribute value(s) and/or corresponding data (e.g., data value(s)) the user does not have permission to view, the computing system (e.g., computing system 110) can employ (e.g., reference, access, read, analyze, implement, execute) a permissions system that can include information on what type of data a user has access to. For example, in these embodiments, the computing system can employ a permissions system that can include a mapping file (e.g., index, table, look-up table, configuration file) that can map (e.g., associate) each attribute value to a sector and/or department of an organization that is associated with at least a portion of the data (e.g., at least one data value) corresponding to the attribute value. For instance, in these embodiments, such a permissions system can include a mapping file (e.g., index, table, look-up table, configuration file) that maps (e.g., associates) a "$100,000 or more per year" attribute value to payroll data and/or a "resides in Austin, TX" attribute value to human resources data. As such, in these embodiments, if the computing system determines (e.g., by using the mapping file of the permissions system) that a user does not have permission (e.g., access or privilege rights) to view payroll data, the computing system will prevent the user from selecting the "$100,000 or more per year" attribute value. Similarly, in these embodiments, if the computing system determines (e.g., by using the mapping file of the permissions system) that a user does not have permission (e.g., access or privilege rights) to view human resources data, the computing system will prevent the user from selecting the "resides in Austin, TX" attribute value.

In some embodiments, as an additional or alternative safeguard, if the user is able to by-pass the above-described safeguard that prevents the user from selecting the attribute value(s) corresponding to data the user does not have permission to view, the computing system (e.g., computing system 110) can also prevent such a user from saving (e.g., in a permanent memory environment and/or database coupled to the computing system) any of such attribute value(s) selected by the user. In these embodiments, as an additional or alternative safeguard, if the user is able to by-pass the above-described safeguard that prevents the user from selecting the attribute value(s) corresponding to data the user does not have permission to view, the computing system can also prevent such a user from saving (e.g., in a permanent memory environment and/or database coupled to the computing system) any group object that may have been created (e.g., in a temporary memory environment via a GUI) and/or at least partly defined using such attribute value(s).

Potential Attribute Value Change Scenario Simulation

Example embodiments of the present disclosure are further directed to a computing system (e.g., computing system 110) that can generate (e.g., program, define, configure) and/or implement (e.g., execute, run) an indemnity condition that can simulate an outcome that would result if and/or when a potential change to an attribute value occurs at some time in the future with respect to a current and/or incoming new group member of a first group object that was created and/or defined based at least in part on (e.g., using) the attribute value. In these embodiments, such a simulated outcome can include and/or constitute a determination and/or identification of one or more second group objects that were also created and/or defined based at least in part on (e.g., using) the attribute value, and thus, would be affected if and/or when the potential change to the attribute value is implemented at some time in the future with respect to the current and/or incoming new group member of the first group object. For instance, in these embodiments, such a simulated outcome can include and/or constitute a determination and/or identification of such a first group object and/or second group object(s) whose membership would be affected if and/or when the potential change to the attribute value is implemented at some time in the future with respect to the current and/or incoming new group member of the first group object. In these embodiments, the computing system can generate and/or implement the indemnity condition to perform such a simulation described above by using, for instance, an object-oriented or object-based programming language and/or functionality (e.g., encapsulation, abstraction, polymorphism, inheritance).

In the above embodiments, the indemnity condition can include and/or constitute, for instance, a machine and/or computer-readable and/or executable programming component that can be executed using a processor. For example, in these embodiments, the indemnity condition can include and/or constitute a script of code (e.g., one or more lines of code, processing threads, instructions), a software module, instructions, code, a workflow, a function, an algorithm, an "IF/THEN" statement or expression, and/or another machine and/or computer-readable and/or executable programming component that can be executed using a processor to simulate a potential change to an attribute value (e.g., "engineering department") with respect to a current and/or incoming new group member (e.g., an employee of engineering department) of a group object (e.g., an "engineering department—Austin, TX" group object) that was created based at least in part on (e.g., using) the attribute value. In these embodiments, the indemnity condition can include and/or reference (e.g., with an identifier, pointer): a list of one or more attribute values that can be used (e.g., that have been used and/or will be used) to create and/or define one or more group objects; and/or the above-described dependency mapping file that respectively maps (e.g., associates) one or more attribute values to at least one group object that was created using the attribute value(s).

In the above embodiments, the potential change to the attribute value can be defined by a user (e.g., at runtime, using a GUI) and/or can be predefined (e.g., by computing system 110) as one of one or more predefined potential attribute value change scenarios that can be offered (e.g., via a GUI) to a user for simulation. For example, in these embodiments, the computing system can generate a user interface (e.g., a GUI) having one or more interface elements (e.g., input fields) that allow a user to: input (e.g., using a query language formula as described above) one or more user defined potential attribute value change scenarios to be simulated by the computing system using the indemnity condition and/or dependency mapping file described above; and/or input (e.g., select) one or more predefined potential attribute value change scenarios that can be offered by the computing system to the user for simulation by the computing system using the indemnity condition and/or dependency mapping file described above.

In some embodiments, examples of such user defined and/or predefined potential attribute value change scenarios can include, but are not limited to, for instance: the potential transfer of an employee from an engineering department of an organization to a sales department of the organization at some time in the future, where a potential change to an "engineering department" attribute value with respect to the employee can be simulated by the computing system (e.g., computing system 110) using the indemnity condition and/or dependency mapping file described above; the potential salary adjustment (e.g., increase, decrease) of an employee at some time in the future that causes the employee to thereafter be in a different income and/or tax bracket, where a potential change to a "$100,000 or more per year" attribute value with respect to the employee can be simulated by the computing system using the indemnity condition and/or dependency mapping file described above; and/or another potential attribute value change scenario.

In one embodiment, a potential attribute value change scenario that can be simulated by the computing system (e.g., computing system 110) using the indemnity condition and/or dependency mapping file described above can include an employee that may be transferred at some time in the future from an engineering department of an organization to a sales department of the organization. In this embodiment, the computing system can simulate the potential change to an "engineering department" attribute value with respect to the employee by using (e.g., executing, implementing, running) the indemnity condition to determine (e.g., using the above-described dependency mapping file) one or more potential group membership changes that would result if and/or when the employee is transferred from the engineering department to the sales department. For example, in this embodiment, the computing system can determine that if and/or when the employee is transferred from the engineering department to the sales department, the employee would no longer be a member of one or more first group objects (e.g., an "engineering department—Austin, TX" group object) that were created and/or defined based at least in part on (e.g., using) the "engineering department" attribute value. Similarly, in this embodiment, the computing system can also determine that if and/or when the employee is transferred from the engineering department to the sales department, the employee would become a member of one or more second group objects (e.g., a "sales department—Austin, TX" group object) that were created based at least in part on (e.g., using) a "sales department" attribute value.

In the above embodiment, based at least in part on determining the potential group membership change(s) that would occur if and/or when the employee is transferred from the engineering department to the sales department, the computing system (e.g., computing system 110) can also determine one or more consequential changes that would occur if and/or when such a transfer is actually implemented at some time in the future. For example, in this embodiment, the computing system can determine that the employee would no longer have access to certain first resources (e.g., engineering related databases, repositories) that the employee currently has access to as a member of such first group object(s) (e.g., an "engineering department—Austin, TX" group object) that were created and/or defined based at least in part on (e.g., using) the "engineering department" attribute value. Similarly, in this embodiment, the computing system can also determine that the employee would have access to certain second resources (e.g., sales related databases, repositories) as a result of the employee becoming a member of such second group object(s) (e.g., a "sales department—Austin, TX" group object) that were created and/or defined based at least in part on (e.g., using) the "sales department" attribute value.

In the above embodiment, therefore, the computing system can simulate a potential change to an attribute value with respect to a current and/or incoming new group member of a group object that was created and/or defined based at least in part on (e.g., using) the attribute value by determining the output of the indemnity condition, which can be, for instance, the above-described potential group membership change(s) that would be triggered if and/or when the employee is transferred from the engineering department to the sales department. In this embodiment, as described above, such a potential attribute value change could affect membership of certain first group object(s) that the employee is currently a member of as an employee in the engineering department, which would impact the output of the indemnity condition. Similarly, in this embodiment, such a potential attribute value change could affect membership of certain second group object(s) that the employee would become a member of as an employee in the sales department, which would also impact the output of the indemnity condition. In example embodiments described herein, the potential group membership change(s) can be considered "simulated" change(s) and they would cause the first group object(s) that the employee is currently a member of as an employee in the engineering department, as well as the second group object(s) that the employee would become a member of as an employee in the sales department, to become "dirty."

In the above embodiments, to simulate what the output of the indemnity condition would be at some time in the future if and/or when the potential attribute value change is implemented in a database, the computing system (e.g., computing system 110) can run the above-described "dirty" first and/or second group object(s) through the indemnity condition to determine the output (e.g., the computing system can apply the indemnity condition to the potential attribute value change scenario involving the potential transfer of the employee from the engineering department to the sales department). For example, in these embodiments, the computing system can run the "dirty" first and/or second group object(s) through the indemnity condition to determine whether the indemnity condition would simulate a correct update and/or refresh (e.g., correct group object membership update and/or refresh) of such "dirty" first and/or second group object(s) to reflect the simulated potential group membership change(s) that would occur if and/or when the employee is transferred from the engineering department to the sales department at some time in the future.

In example embodiments of the present disclosure, to facilitate a simulation of a potential attribute value change scenario (e.g., an employee's potential transfer from a first department of an organization to a second department at some time in the future) and/or one or more potential resulting changes associated therewith (e.g., potential group membership change(s), consequential change(s)), the computing system (e.g., computing system 110) can generate and/or temporarily store any temporary dataset(s) associated with such a simulation. For instance, in these embodiments, the computing system can generate and/or temporarily store any temporary dataset(s) associated with such a simulation in a temporary memory (also referred to herein as a "temporary memory environment"), rather than implement the potential attribute value change scenario, and/or any of such potential resulting change(s) associated therewith, in a database and/or a permanent memory (also referred to herein as a "permanent memory environment"). In at least one embodiment, the computing system can perform such a simulation in such a temporary memory by using the temporary memory to perform one or more operations of the simulation (e.g., by using the temporary memory to temporarily generate (e.g., for relatively short-term use and/or evaluation) any temporary dataset(s) associated with the simulation and/or temporarily store such temporary dataset(s) in the temporary memory).

In example embodiments of the present disclosure, the computing system (e.g., computing system 110) can generate and/or temporarily store temporary datasets that can include, but are not limited to: temporary data (e.g., in the form of a temporary table, temporary index, temporary list, temporary object); temporary object(s) (e.g., temporary group object(s) with or without a temporary dataset included therein); temporary object instance(s) (e.g., temporary group object instance(s) with or without a temporary dataset included therein) of a class (e.g., a group class) associated with an object-oriented database or object-based database; and/or another type of temporary dataset associated with such a simulation. For instance, in these embodiments, the computing system can temporarily store: temporary dataset(s) that can be used as input to perform one or more simulation operations (e.g., using the above-described indemnity condition and/or dependency mapping file); temporary dataset(s) that can be generated as output from performing one or more simulation operations (e.g., using the above-described indemnity condition and/or dependency mapping file); and/or another temporary dataset(s) associated with performing one or more simulation operations (e.g., using the above-described indemnity condition and/or dependency mapping file).

In the above embodiments, the computing system (e.g., computing system 110) can generate and/or temporarily store such temporary dataset(s) in a temporary memory that can be coupled to the computing system such as, for instance, a volatile memory, a cache memory, and/or another temporary memory that can be coupled to the computing system. In these embodiments, the computing system can generate and/or store such temporary dataset(s) in such a temporary memory rather than implement the above-described potential attribute value change scenario and/or potential resulting change(s) in a permanent memory (e.g., memory device(s) 116, 136, 156, 202 described herein) and/or database that can be coupled to the computing system. That is, for instance, in these embodiments, the computing system can generate and/or store such temporary dataset(s) in such a temporary memory rather than refreshing and/or updating any existing dataset(s) in a permanent memory and/or database to reflect the potential group membership change(s) that would occur if and/or when the potential attribute value change scenario were to be implemented.

In one embodiment, the computing system (e.g., computing system 110) can instantiate (e.g., in the temporary memory described above) an object class to generate (e.g., in the temporary memory described above) an object instance of the object class as described herein. In this embodiment, the object instance can constitute a temporary dataset.

For instance, in the above embodiment, the computing system (e.g., computing system 110) can use an object-oriented or object-based programming language and/or functionality (e.g., encapsulation, abstraction, polymorphism, inheritance) to: generate (e.g., in the temporary memory described above) an object class having the above-described indemnity condition and/or dependency mapping file stored therein; instantiate (e.g., in the temporary memory described above) the object class to generate (e.g., in the temporary memory described above) an object instance of the object class; execute (e.g., in the temporary memory described above) the indemnity condition using a potential attribute value change scenario as input to simulate (e.g., in the temporary memory described above) the potential attribute value change scenario; determine (e.g., in the temporary memory described above, using the above-described dependency mapping file), as output from execution of the indemnity condition, the potential group membership change(s) to one or more group objects that would occur if and/or when the potential attribute value change scenario was actually implemented at some time in the future; and/or store (e.g., temporarily) the output of the indemnity condition in the object instance (e.g., temporarily store the potential group membership change(s) to the group object(s) in the object instance, which itself can be generated and/or temporarily stored in the temporary memory described above). In this embodiment, such an object instance that can be used by the computing system to store (e.g., temporarily) the output of the indemnity condition (e.g., the potential group membership change(s) to the group object(s)) can constitute a temporary dataset that is referred to herein as a "temporary simulated outcome object."

In some embodiments, the computing system (e.g., computing system 110) can delete any of the above-described temporary datasets associated with implementing the indemnity condition to simulate one or more potential attribute value change scenarios, including the temporary simulated outcome object, and/or the contents thereof, that can be used by the computing system to store (e.g., temporarily) the output of the indemnity condition (e.g., the potential group membership change(s) to the group object(s)). For example, in some embodiments, the computing system can delete the temporary simulated outcome object and/or the contents thereof, which can constitute and/or include the output of the indemnity condition (e.g., the potential group membership change(s) to the group object(s)).

In some embodiments, the computing system (e.g., computing system 110) can delete any of the temporary datasets described herein in accordance with one or more embodiments based at least in part on (e.g., in response to): receiving (e.g., via a GUI) user input that is indicative of an instruction for the computing system to delete one or more of such temporary datasets (e.g., the above-described temporary simulated outcome object that can be used by the computing system to temporarily store the output of the indemnity condition); one or more defined conditions that, when satisfied, trigger the deletion of such temporary datasets by the computing system (e.g., expiration of a predefined time limit, completion of a certain operation that is indicative of the completion of the simulation process);

and/or an interruption of power supplied to the computing system (e.g., powering off the computing system).

In some embodiments, the computing system (e.g., computing system 110) can implement the above-described one or more potential membership changes to one or more group objects that have been created and/or defined based at least part on (e.g., using) an attribute value for which a potential change has been simulated using the indemnity condition as described above. In these embodiments, the computing system can implement the potential membership change(s) on the group object(s) that have been identified during the above-described simulation process as being group object(s) that would be affected by the potential change to the attribute value if implemented. In some embodiments, the computing system can implement the potential membership change(s) to such affected group object(s) with respect to one or more certain current and/or incoming new group members such that the current and/or incoming new group member(s) are added to and/or removed from one or more of such affected group object(s). In some embodiments, the computing system can implement, in a permanent memory (e.g., memory device(s) 116, 136, 156, 202) and/or database that can be coupled to the computing system, the potential membership change(s) to such affected group object(s) such that the resulting change(s) to the membership of such affected group object(s) and/or the resulting updated (e.g., refreshed) group object(s) are stored (e.g., saved) in such a permanent memory and/or database.

In some embodiments, the computing system (e.g., computing system 110) can implement the above-described potential membership change(s) to such affected group object(s) by updating and/or refreshing (e.g., adding and/or removing certain current and/or incoming new group member(s)) from such affected group object(s)). In some embodiments, the computing system can implement the potential membership change(s) to such affected group object(s) by notifying at least one of such affected group object(s) of the change to the attribute value with respect to one or more current and/or incoming new group members) of such affected group object(s). In these embodiments, the affected group object(s) that have been notified by the computing system of the change can update and/or refresh themselves to reflect the attribute value change with respect to one or more current and/or incoming new group members of such affected group object(s) (e.g., by adding and/or removing such current and/or incoming new group member(s)). In some embodiments, the affected group object(s) that have been notified by the computing system of the change can then notify one or more other affected group objects that can then update and/or refresh themselves to reflect the attribute value change with respect to one or more of their current and/or incoming new group members (e.g., by adding and/or removing such current and/or incoming new group member(s)). In some embodiments, the computing system can implement the above-described potential membership change(s) to such affected group object(s) based at least in part on user input (e.g., received via a GUI) indicative of an instruction for the computing system to implement the potential change to the attribute value with respect to one or more certain current and/or incoming new group members of such affected group object(s).

The systems, devices, methods, and/or computer program products described herein provide a number of technical effects and benefits. For example, in one embodiment, the computing system (e.g., computing system 110) can intelligently (e.g., automatically, without human intervention or input) and/or dynamically (e.g., approximately in real-time or near real-time) determine that a change to a particular attribute value has occurred only with respect to a specific entity (e.g., employee, device, department) and that such a change only affects a specific group object. In this embodiment, the computing system can then intelligently (e.g., automatically, without human intervention or input) and/or dynamically (e.g., approximately in real-time or near real-time) evaluate, update, and/or refresh the membership of the specific group object only with respect to the specific entity (e.g., as opposed to evaluating membership of all entities of this specific group object and/or evaluating membership of the specific entity with respect to other group objects). In this embodiment, such a targeted approach to evaluating, updating, and/or refreshing only the specific group object only with respect to the specific entity can thereby limit the number and/or complexity of group object membership evaluation, update, and/or refresh operations associated with a plurality of group objects in a database. In this embodiment, by limiting the number and/or complexity of such group object membership evaluation, update, and/or refresh operations associated with a plurality of group objects, the computing system can thereby reduce processing workload and/or computational costs of a processor tasked with implementing such operations, as well as improve processing efficiency of such a processor.

In example embodiments of the present disclosure, the computing system (e.g., computing system 110) can allow for a user to create and/or define a group object based at least in part on (e.g., using) any attribute value associated with any entity and/or any aspect associated with, for instance, an organization. In these embodiments, the computing system can allow for queries (e.g., database search queries, statements, expressions, formulas) and/or conditions (e.g., trigger event conditions, statements, expressions) that can be used in connection with creating, defining, and/or implementing group objects to be relatively more complex and/or granular compared to that of existing systems, as such queries and/or conditions can include a relatively high number of different attribute values respectively associated with a relatively high number of different entities and/or aspects associated with an organization. Similarly, in these embodiments, the computing system can further allow for such relatively more complex and/or granular queries and/or conditions to return results (e.g., data, data values) that are relatively more complex and/or granular compared to results returned by existing systems. In these embodiments, by allowing for such relatively more complex and/or granular results to be returned, the computing system can thereby reduce the number of queries run against a database to obtain such results, which can reduce processing workload and/or computational costs of a processor tasked with executing such queries against a database, as well as improve processing efficiency of such a processor.

In some embodiments of the present disclosure, the computing system (e.g., computing system 110) can provide permissions-based safeguarding of any attribute value(s) that can only be viewed and/or accessed by certain users. For example, in embodiments where the computing system creates and/or defines a group object based at least in part on (e.g., using) one or more attribute values defined by a user, when the user is viewing and/or selecting (e.g., via a GUI) such attribute value(s), the computing system can prevent the user from viewing and/or selecting one or more certain attribute values that respectively correspond to data that the user does not have permission (e.g., access or privilege rights) to view (e.g., data that the user does not have permission to view in a permanent memory environment and/or database coupled to the computing system). In some embodiments, as an additional or alternative safeguard, if the user is able to by-pass the above-described safeguard that prevents the user from selecting the attribute value(s) corresponding to data the user does not have permission to view, the computing system (e.g., computing system 110) can also prevent such a user from saving (e.g., in a permanent memory environment and/or database coupled to the computing system) any of such attribute value(s) selected by the user and/or any group object that may have been created (e.g., in a temporary memory environment via a GUI) and/or at least partly defined using such attribute value(s).

In another embodiment, it should be further appreciated that the computing system (e.g., computing system 110) can simulate a potential change to a particular attribute value that may occur at some time in the future and determine that such a potential change would only affect a certain entity's membership in one or more specific group objects. In this embodiment, such a determination by the computing system can provide a user with a preview of the specific group object(s) that would be affected by the potential change to such a particular attribute value if implemented at some time in the future. In this embodiment, based on such a preview of the impact(s) of the potential change to the attribute value, the computing system can also determine (e.g., compute, calculate) and/or provide an approximation of the computational and/or resource costs that would be incurred as a result of implementing the potential change to the attribute value at some time in the future. Therefore, in this embodiment, the computing system can allow for a user to simulate one or more different potential attribute value change scenarios (e.g., an attribute value change with respect to a certain current and/or incoming new group member) to determine what the effect would be on one or more group objects and/or the approximate computational and/or resource costs that could be associated with implementing such potential attribute value change scenario(s) at some time in the future. In this embodiment, the computing system can further allow for the user to then elect to implement a certain potential attribute value change scenario that would provide a certain desired result (e.g., the potential attribute value change scenario that would incur the least computational and/or resource costs).

As another example, the embodiments described in the present disclosure perform integration and synchronization of organizational data across a variety of applications and systems (e.g., 5, 10, 100, 1000, etc.) that utilize different underlying technologies and technical designs more efficiently and with fewer computing resources (e.g., less processing power, less memory usage, less power consumption, etc.), that would otherwise be wasted by maintaining custom, proprietary, and/or manual processes. In particular, examples of the present disclosure integrate organizational data and associated processing across different applications and systems using a rigorous computerized process that provides high-throughput, resilient, and rapid synchronization of organizational data across distributed applications and computing systems.

Some example aspects of the present disclosure can be implemented in or by an organizational management platform that controls and leverages organizational data to manage organizational applications such as payroll, operations, human resources (e.g., onboarding and offboarding), benefits, information technology and device management, third-party application integration and access, and many others.

The organizational management platform can hold, for each of one or more organizations, a centralized set of organizational data that acts as a single, centralized system of record for all organizational management processes for that organization. Each organization can include a number of users which are able to access and interact with the organizational management platform. Some users may have administrative permissions which define whether the user is able to access and/or modify certain types of organizational data for their organization.

The organizational data for each organization can include data directly entered into the organizational management platform and/or can include data retrieved, pulled, or otherwise obtained from one or more first-party and/or third-party applications with which the organizational management platform may have varying levels of integration. This ingestion and storage of data from third-party applications is in contrast to systems which simply sit on top of third-party applications and apply rules at run time. In some implementations, the organizational management platform can provide a user with the ability (e.g., by configuring Simple Mail Transfer Protocol (SMTP) settings) to configure the cadence or periodicity at which the organizational management platform receives or ingests data (e.g., via .csv files) from third-party applications.

The organizational data can, in some implementations, be held as one or more object databases. For example, multiple object classes can be defined in the object databases. Example object classes include employees, devices, job candidates, benefits policies, documents, pay instances, timecards, and/or other objects. For each object, values can be provided and maintained for one or more attributes, such as location, role, salary, etc. Links can be made between different objects. For example, one or more device objects can be associated with employee objects.

The object database(s) can be represented as or can store data which can be represented as one or more graphs with nodes that correspond to objects and edges that correspond to links or logical associations between objects and/or object attribute(s). Graph(s) can be traversed to understand or leverage relationships among objects and their attribute(s). In one example, the organizational data can be synthesized into a single graph which includes multiple classes of objects and defines complex relationships among objects and their attribute(s). For example, all workflows, including payroll, IT, etc. can be run through one platform and graph. In some implementations, the employee objects can be referred to and/or treated as sentinel nodes.

As used herein, the term "data element" can refer to one or more data objects, an attribute value for one or more data objects, and/or other forms of data such as fields, references, columns, or values. Data elements can be stored in a dataset. A dataset can be stored in a single database or can be distributed among multiple databases. Datasets can be stored in database tables and/or in other formats such as the data graph structure described herein.

In some implementations, the organizational data can include organizational structure data. For example, the organizational structure data can be encoded within links or edges defined between objects of the organizational data or can be stored as a separate data layer. For example, the organizational structure data can define organizational relationships between objects, including employee objects. As one example, the organizational structure data may indicate that a first employee object has the relationship of "manager" relative to a second employee object. The organizational relationships can be defined between specific objects and/or groups of objects. As another example, the organizational structure data may indicate that a first group of employees (e.g., the "IT Administrator" group of employees) has a certain set of permissions (e.g., device activation/deactivation) relative to a particular group of devices (e.g., the "work laptops" group of the devices).

Some example aspects of the present disclosure can leverage or be implemented using a domain-specific query language. For example, the domain-specific query language can be used to perform (e.g., in real time) queries against the organizational data. The domain-specific query language can be used to define functions or queries which return data that satisfies or responds to the functions or queries. In some implementations, the domain-specific query language is a declarative language. In some implementations, the domain-specific query language includes organization functions or operators which leverage organizational relationships within the organizational data. For example, the organization function ORG(employee,relationship) returns one or more other employees that have the specified relationship to the specified employee.

Thus, example aspects of the present disclosure recognize that organizations generally use many applications and systems to sustain operations. For example, small organizations generally may use several, a dozen, or any number of applications and systems. Medium-sized organizations generally may use several dozen, a hundred, or any number of applications and systems. Large organizations generally may use hundreds, thousands, and/or any number of applications and systems. Many, most, and/or all of the applications and systems used by an organization rely on organizational data and processing tied to the organizational data.

However, very few applications and systems provided by one party (e.g., another organization, a vendor, a provider, a supplier, etc.) offer integration with applications and systems from other parties. As a result, organizations may build expensive, proprietary integration applications that require maintenance and usually break when one or more of the associated applications and/or systems is changed by the vendor (e.g., especially in scenarios where an organization defines and uses their own custom fields that rely on organizational data provided by a vendor application or system). Further, organizations that do not have the resources or expertise to build such proprietary integration applications rely on constant manual upkeep of organizational data across different applications and systems, which generally results in delays, inconsistencies, and errors. As such, organizations can benefit from improved application integration and synchronization of organizational data across different applications and systems.

The present disclosure provides examples of performing application integration and synchronization of data across distributed applications and systems. In examples of the present disclosure, a computer system may perform such integration and synchronization between applications and systems, for example, by obtaining application data associated with an application that is separate from a computing system that comprises organizational data of an organization, analyzing the application data based on one or more rules associated with the computing system and integration information for integrating the application with the organizational data of the organization, processing the application data based on the integration information associated with the third-party application, and performing one or more operations associated with the organizational data in the organizational system based on processing the application data. The organizational system also may generate and transmit information to one or more other applications integrated with the organizational system based on performing the operations associated with the organizational data.

According to an aspect of the present disclosure, the organizational management platform can "pull," retrieve, or otherwise receive data from one or more linked third-party applications. The organizational management platform can then process or otherwise leverage this data in reports, policies, triggering, data management, and/or workflows using employee record data or other organizational data held by the core system of record.

As one example, an organizational management platform can receive application data from a third-party application of a plurality of third-party applications. The application data can be descriptive of an action performed in the third-party application. For example, the action can be a user-performed action performed by a user in the third-party application or the action can be an application-performed action performed by the third-party application. As one example, the action can describe an update to data stored in or otherwise associated with the third-party application.

The organizational management platform can access one or more rules associated with an organization and integration information for integrating the third-party application with the organizational data of the organization. The access of the integration information can be performed periodically and/or in specific response to receipt of the data from the third-party application. The integration information associated with the third-party application can describe how changes to various forms of data (e.g., data contained in the platform's centralized database and/or data contained in the third-party application) should cause actions (e.g., data updates) to be performed in the third-party application and/or in the centralized database. One or more sets of integration information can be defined for each application. Integration information may be specific to each application and/or may be shared across multiple applications.

The organizational management platform can evaluate the integration information associated with the third-party application to determine one or more operations associated with implementing the integration information. The one or more operations associated with implementing the integration information can include causing an action to be performed in the third-party application and/or causing an action to be performed in the platform's centralized database. As one example, an action in the platform's centralized database can include an update to data stored in the database (e.g., an employee record stored in the database).

In some instances, the organizational management platform can communicate with the third-party application to cause the action to be performed in the third-party application by the third-party application. For example, the action in the third-party application can include updating of data held by the third-party application or other actions within the third-party application (e.g., triggering of intra-application communications, etc.).

In some implementations, the rules, integration information, and/or application policy associated with the third-party application can be a user-defined policy defined by an administrator of the organizational management platform. As one example, the user-defined application policy can be a user-defined query expressed in a domain-specific query language. In such instances, evaluating the policy can include executing the user-defined query relative to the set of organizational data. For example, the query may return a set of results (e.g., employee objects or other data objects)

for which actions should be taken in the third-party application and/or within the centralized database.

With reference to the Figures, example embodiments of the present disclosure will be discussed in further detail.

FIG. 1 depicts a block diagram of an example computing environment 100 including a computing system 110 that performs operations according to example embodiments of the present disclosure. The computing environment 100 includes a network 102, a computing system 110, one or more computing devices 112, one or more processors 114, one or more memory devices 116, data 118, instructions 120, one or more input devices 122, one or more output devices 124, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the internet. Further, the network 102 can include any number of wired or wireless connections and/or links that can be used to communicate with one or more computing systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols, encodings or formats, and/or protection schemes. For example, communication over the network 102 can be performed using: communication protocols such as, for instance, transmission control protocol/internet protocol (TCP/IP), hypertext transfer protocol (HTTP), simple mail transfer protocol (SMTP), and/or file transfer protocol (FTP); encodings or formats such as, for instance, hypertext markup language (HTML) and/or extensible markup language (XML); and/or protection schemes such as, for instance, virtual private network (VPN), secure HTTP, and/or secure sockets layer (SSL).

The computing system 110 can include any combination of systems and/or devices including one or more computing systems (not shown) and/or one or more computing devices 112. Further, the computing system 110 may be connected (e.g., networked) to one or more computing systems (e.g., remote computing system 130) and/or one or more computing devices (e.g., one or more computing devices 132, 152) via the network 102. The computing system 110 may operate in various different configurations including as a server or a client machine in a client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes the one or more computing devices 112. The one or more computing devices 112 can include any type of computing device. For example, the one or more computing devices 112 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, an application specific integrated circuit (ASIC), a field-programmable gate array (FPGA), a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random-access memory (RAM), read-only memory (ROM), programmable ROM (PROM), electrically erasable PROM (EEPROM), erasable PROM (EPROM), one or more flash memory devices, and/or one or more magnetic storage devices (e.g., one or more hard disk drives). Memory devices 116 can include devices which operate as database(s) to store dataset(s).

The one or more processors 114 can be configured to execute one or more instructions to perform the operations described herein including, for example, one or more operations associated with providing multi-platform application integration and data synchronization across one or more applications including, for example, third-party applications. Further, the one or more memory devices 116 can store the data 118 and/or the instructions 120, which can be executed by the one or more processors 114 to cause the one or more computing devices 112 to perform one or more operations. For example, the one or more operations performed by the one or more processors 114 can include obtaining third-party application data, analyzing third-party application data based on one or more rules and/or integration information associated with a related third-party application, processing the third-party application data based on the integration information and one or more organizational records, and performing one or more operations associated with the organizational data based on processing third-party application data, etc.

The data 118 can include organizational data (e.g., organizational data that can include one or more organizational records), one or more data structures defining, describing, and/or otherwise associated with the organizational data, rule data (e.g., rule data that includes one or more rules used to configure an application policy, one or more rules maintained by or otherwise associated with an organizational data management system, etc.), application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), organizational policy data (e.g., organizational policy data associated with one or more organizational policies), application policy data (e.g., policy data that includes one or policies associated with the organizational data, the rule data, the application data, one or more applications, one or more devices, etc.), and/or other types of data. Further, the instructions 120 can include one or more instructions to use data including the data 118 to perform any one or more of the various operations described herein. In some embodiments, the one or more memory devices 116 can be used to store one or more applications that can be operated by the one or more processors 114. The data 118, the instructions 120, and/or the one or more applications can be associated with an organization. Further, the computing system 110 may be associated with an organization and may be configured to manage the one or more applications. For example, the computing system 110 can perform one or more operations associated with authenticating one or more users that attempt to access the one or more applications which can include one or more third-party applications, which may be remote from the computing system 110.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations (e.g., operations associated with providing application integration and synchronization) based at least in part on the one or more inputs.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102.

In some embodiments, the remote computing system 130 can include one or more applications (e.g., computer software applications) that can be stored and/or executed by the remote computing system 130. Further, the one or more applications can include one or more third-party applications that may be accessed from the computing system 110 and which are at least partly operated from the remote computing system 130. The one or more third-party applications generally may be associated with and provided by an organization that is different from the organization that is associated with the computing system 110. Further, the data 138 can include one or more portions of the organizational data (e.g., one or more organizational records), one or more data structures associated with the organizational data, rule data, organizational policy data, application policy data, third-party integration data, and/or other types of data.

One or more computing devices 152 (e.g., user devices or any other types of devices) can include one or more processors 154, one or more memory devices 156, the data 158, and/or the instructions 160. Such one or more computing devices 152 may include any of the attributes and/or capabilities of the one or more computing devices 112, 132. Further, such one or more computing devices 152 can communicate with one or more devices and/or one or more systems via the network 102.

In some embodiments, the one or more computing devices 152 can include one or more applications (e.g., computer software applications) that can be stored and/or executed by such one or more computing devices 152. Further, the one or more applications can include one or more third-party applications that may be accessed from the one or more computing devices 152 and which are at least partly operated from such one or more computing devices 152. Data 158 may include, for example, one or more portions of the organizational data (e.g., one or more organizational records), one or more data structures associated with the organizational data, rule data, organizational policy data, application policy data, third-party integration data (e.g., third-party application integration data), and/or other types of data.

Figure 2:
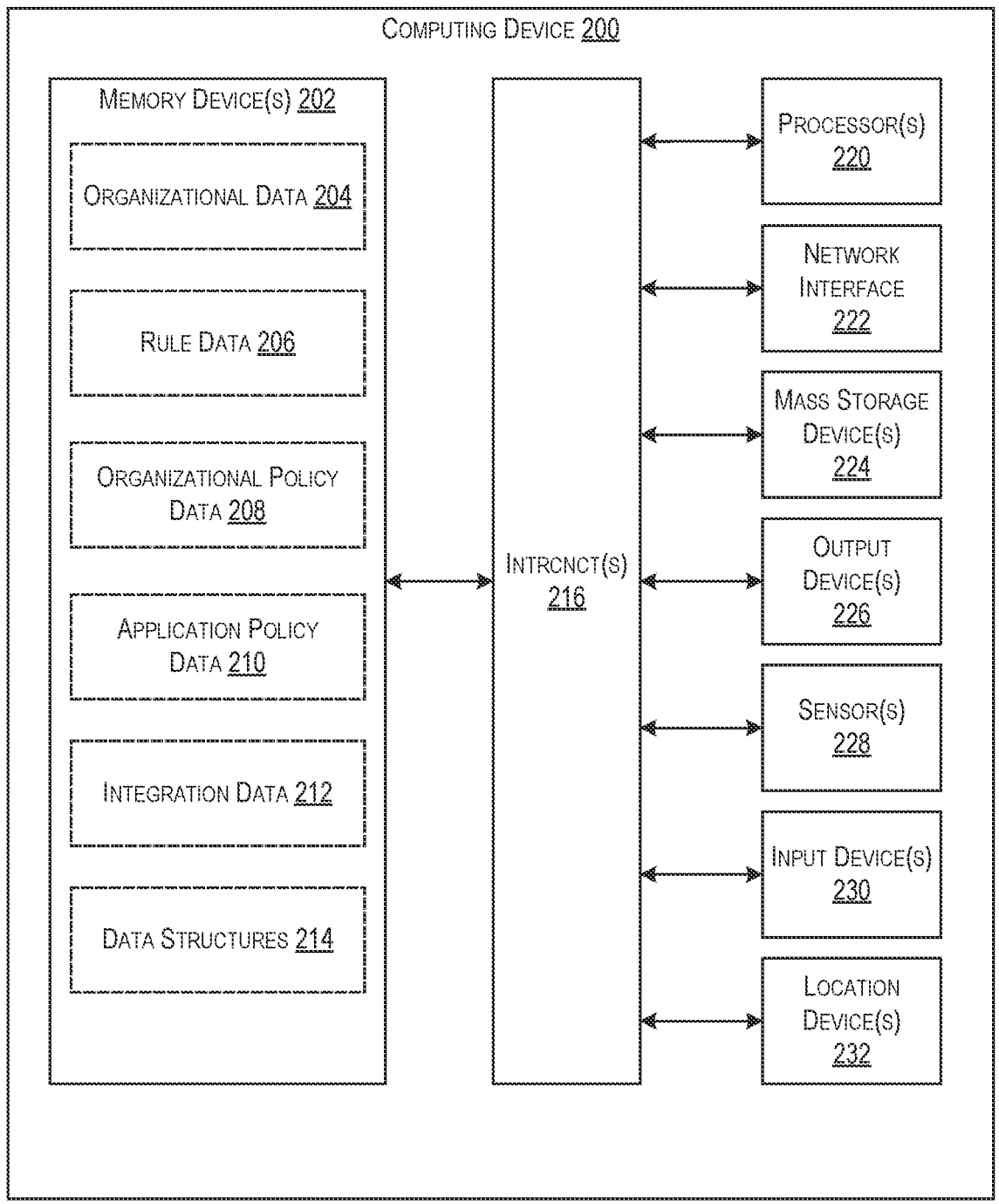
FIG. 2 depicts a block diagram of an example of a computing device, according to example embodiments of the present disclosure.

FIG. 2 depicts a block diagram of an example computing device 200 according to example embodiments of the present disclosure. The computing device 200 can include one or more attributes and/or capabilities of the computing system 110, the remote computing system 130, the one or more computing devices 132, the one or more computing devices 152, and/or the computing device 200. Furthermore, the computing device 200 can be configured to perform one or more operations and/or one or more actions that can be performed by the computing system 110, the remote computing system 130, the one or more computing devices 132, the one or more computing devices 152, and/or the computing device 200.

As shown in FIG. 2, the computing device 200 can include one or more memory devices 202, organizational data 204, rule data 206, organizational policy data 208, application policy data 210, integration data 212, data structures 214, one or more interconnects 216, one or more processors 220, a network interface 222, one or more mass storage devices 224, one or more output devices 226, one or more sensors 228, one or more input devices 230, and/or one or more location devices 232.

The one or more memory devices 202 can store information and/or data (e.g., organizational data 204, rule data 206, organizational policy data 208, application policy data 210, integration data 212, data structures 214, and/or any other data). Further, the one or more memory devices 202 can include one or more non-transitory computer-readable storage media, including RAM, ROM, EEPROM, EPROM, flash memory devices, magnetic disks, and any combination thereof. The information and/or data stored by the one or more memory devices 202 can be executed by the one or more processors 220 to cause the computing device 200 to perform one or more operations associated with providing application integration and data synchronization across one or more third-party applications, including, for example, obtaining third-party application data, analyzing third-party application data based on one or more rules and integration information associated with a related third-party application, processing the third-party application data based on the integration information and one or more organizational records, and performing one or more operations associated with the organizational data based on processing third-party application data.

The organizational data 204 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The organizational data 204 also can include information associated with one or more applications (e.g., one or more third-party applications), one or more organizational records and/or one or more organizational policies. In some embodiments, the organizational data 204 can be received from one or more computing systems (e.g., the remote computing system 130 depicted in FIG. 1) which can include one or more computing systems that are remote (e.g., in another room, building, part of town, city, or nation) from the computing device 200.

The rule data 206 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. The rule data 206 can include information associated with one or more rules that can be used to generate and/or implement an application policy. The rule data 206 also can include information associated with one or more rules of an organizational data management system (e.g., base or default rules provided or enforced by the system, one or more custom rules configured by an organization, etc.). In some embodiments, the rule data 206 can be received from one or more computing systems (e.g., the remote computing system 130 depicted in FIG. 1), which can include one or more computing systems that are remote from the computing device 200.

The organizational policy data 208 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the organizational policy data 208 can include information associated with one or more organizational policies that are used to regulate one or more applications (e.g., one or more third-party applications), one or more computing devices, and/or one or more records which can include one or more organizational records and/or one or more employee records. In some embodiments, the organizational policy data 208 can be received from one or more computing systems (e.g., the remote computing system 130 depicted in FIG. 1) which can include one or more computing systems that are remote from the computing device 200.

The application policy data 210 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the application policy data 210 can include information associated with one or more policies that are used to implement an application policy associated with one or more applications (e.g., one or more third-party applications), one or more computing devices, and/or one or more records which can include one or more organizational records and/or one or more employee records. In some embodiments, the application policy data 210 can be received from one or more computing systems (e.g., the remote computing system 130 depicted in FIG. 1) which can include one or more computing systems that are remote from the computing device 200.

The integration data 212 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. The integration data 212 can include configuration and/or operational information associated with integrating and synchronizing data among one or more applications. For example, the integration data 212 can include information that enables integration and synchronization between each of one or more applications (e.g., third-party applications or other applications). In an embodiment, the integration data 212 provides integration information that allows an organizational data management (e.g., a system of record for organizational data and organizational data processing), for example, to obtain information from one or more applications (e.g., third-party and/or other applications), to perform operations involving organizational data in the organizational data management system, to synchronize organizational data across one or more applications, to perform one or more actions involving the applications based on organizational data in the organizational data management system, and/or to perform one or more other operations associated with managing organizational data as a system of record. In some embodiments, the integration data 212 can be received from one or more computing systems (e.g., the remote computing system 130 depicted in FIG. 1), which can include one or more computing systems that are remote from the computing device 200.

The data structures 214 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. The data structures 214 can include one or more logical and/or physical instances of information representing or describing one or more entities (e.g., objects, records, etc.), one or more relationships involving one or more of the entities, one or more data values associated with each of one or more of the entities and/or one or more of the relationships, one or more functions and/or operations that may be applied to each of one or more of the entities and/or one or more of the relationships, any other data or metadata describing or otherwise defining structure and/or rules associated with one or more of the entities and/or one or more of the relationships, etc.

The data structures 214 can be implemented and utilized with one or more types of computer software, computer hardware, or any combination thereof. In an embodiment, the data structures 214 are used to represent and perform processing associated with various types of organizational data. For example, the data structures 214 may include information about various types of information and entities associated with organizational data including, but not limited to, individuals (e.g., employees, vendors, independent contractors), departments, teams, groups, locations, offices, documents, tasks, reports, accounts, devices, applications, end-user applications, licenses, workflows, alerts, and/or any other types of entities representing or related to managing organizational data. The data structures 214 also can define various relationships among the various entities associated with organizational data. For example, the data structures 214 may define and be used to enforce relationships such as each employee must be assigned to a department, each employee can be included on one or more teams, each employee must be assigned to a primary location, each employee may be assigned to one or more secondary locations, employees may have one or more computing devices, each vendor must have a current audit, each independent contractor must be associated with a contract, and/or any other relationships provided by an organizational data management system or configured for an organization that utilizes an organizational data management system (e.g., a system for managing organizational data based on one or more organizational data management applications).

In some embodiments, the data structures 214 can include one or more object graphs providing information about entities, relationships, and/or any other aspects relating to the definition, structure, and rules associated with organizational data. The data structures 214 also can include any one or more other types of data structures (e.g., with or without the use of object graphs) that provide information about entities, relationships, and/or any other aspects of the definition, structure, and rules associated with organizational data. In some embodiments, the data structures 214 can be received from one or more remote computing systems (e.g., the remote computing system 130 depicted in FIG. 1), which can include one or more computing systems that are remote from the computing device 200. Data structures 214 can include one or more datasets stored in one or more databases.

The one or more interconnects 216 can include one or more interconnects or buses that can be used to send and/or receive one or more signals (e.g., electronic signals) and/or data (e.g., organizational data 204, rule data 206, organizational policy data 208, application policy data 210, integration data 212, data structures 214, and/or any other data) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the one or more location devices 232. The one or more interconnects 216 can be arranged or configured in different ways. For example, the one or more interconnects 216 can be configured as parallel or serial connections. Further the one or more interconnects 216 can include one or more internal buses that are used to connect the internal components of the computing device 200 and one or more external buses used to connect the internal components of the computing device 200 to one or more external devices. By way of example, the one or more interconnects 216 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 204, the rule data 206, the organizational policy data 208, the application policy data 210, the integration data 212, the data structures 214, and/or any other data. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the internet). For example, the network interface 222 can allow the computing device 200 to communicate with the computing system 110 via the network 102.

The one or more mass storage devices 224 (e.g., a hard disk drive and/or a solid-state drive) can be used to store data including the organizational data 204, the rule data 206, the organizational policy data 208, the application policy data 210, the integration data 212, the data structures 214, and/or any other data. The one or more output devices 226 can include one or more display devices (e.g., liquid crystal display (LCD), organic light emitting diode (OLED) display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of invoking or performing one or more operations. For example, the one or more sensors 228 can be used to authenticate the identity of a user and determine an authorization level based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, and/or network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more organizational applications and/or one or more third-party applications) that are subject to one or more application policies or utilize third-party integration data that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The one or more location devices 232 can include one or more devices or circuitry for determining the position of the computing device 200. For example, the one or more location devices 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system, an inertial navigation system, a dead reckoning system, based on IP address, by using triangulation and/or proximity to cellular towers or Wi-Fi hotspots, and/or beacons.

Figure 3:
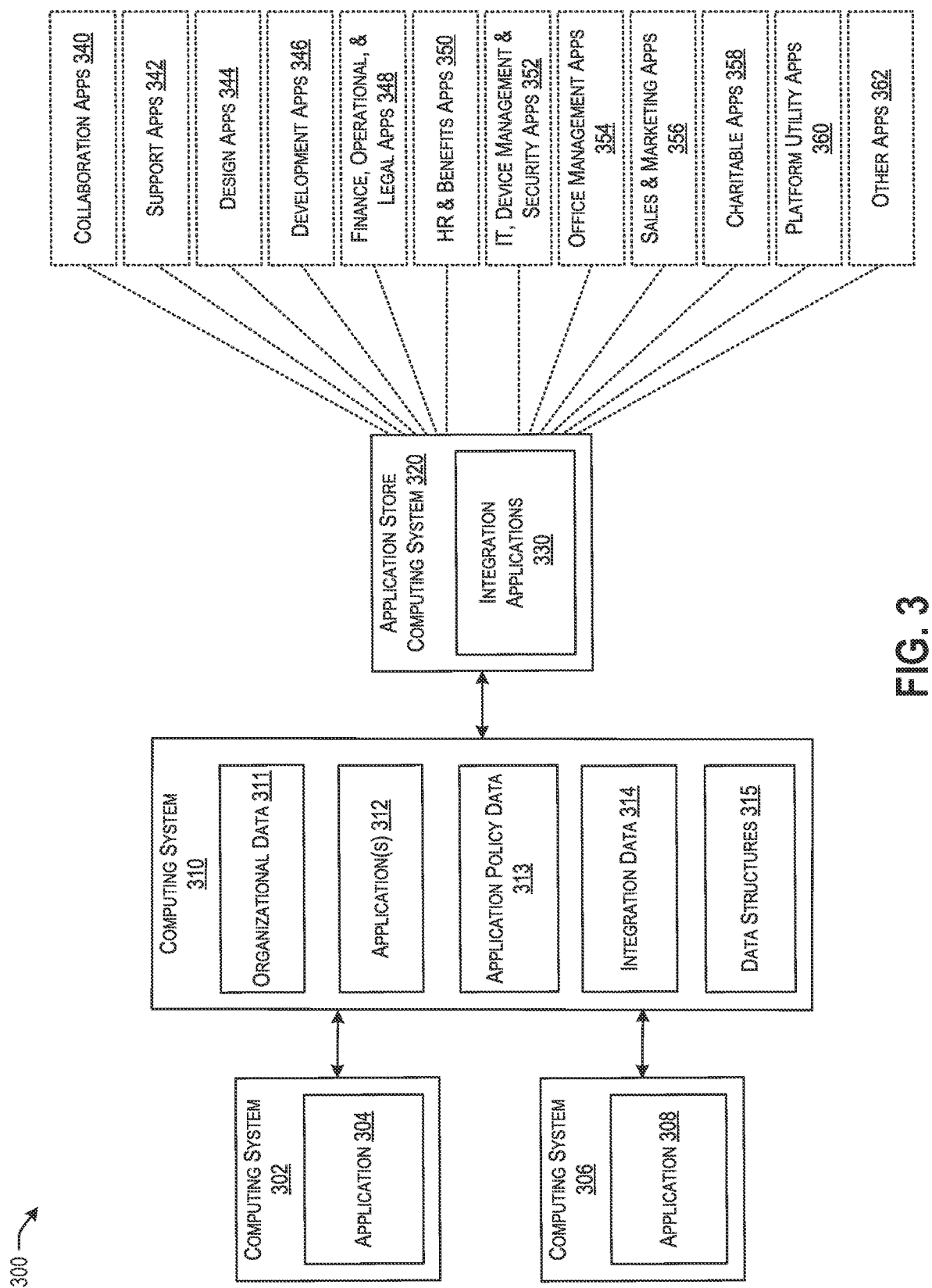
FIG. 3 depicts a block diagram of an example computing environment including multiple computing systems, according to example embodiments of the present disclosure.

FIG. 3 depicts a block diagram of an example computing environment 300 including multiple computing systems, according to example embodiments of the present disclosure. Any of computing system 302, computing system 306, or computing system 310 can include one or more attributes and/or capabilities of the computing system 110, the remote computing system 130, the one or more computing devices 152, and/or the computing device 200. Furthermore, any of the computing system 302, the computing system 306, or the computing system 310 can be configured to perform one or more operations and/or one or more actions that can be performed by the computing system 110, the remote computing system 130, the one or more computing devices 152, and/or the computing device 200.

As shown in FIG. 3, the environment 300 includes the computing system 302, an application 304, the computing system 306, an application 308, the computing system 310, organizational data 311, one or more application(s) 312, application policy data 313, integration data 314, data structures 315, application store computing system 320, integration applications 330, collaboration apps 340, support apps 342, design apps 344, development apps 346, finance, operational, and legal apps 348, human resources (HR) and benefits apps 350, information technology (IT), device management, and security apps 352, office management apps 354, sales and marketing apps 356, charitable apps 358, platform utility apps 360, and other apps 362.

In an embodiment, the computing system 302, the computing system 306, the computing system 310, and/or the application store computing system 320 can be configured to communicate directly and/or via a communication network (e.g., the network 102 depicted in FIG. 1). In one embodiment, the computing system 302 includes an application 304 that is stored and/or operates on the computing system 302 and can communicate (e.g., send and/or receive data and/or information) with one or more other computing systems including the computing system 306 and/or the computing system 310. The application 304 can, for example, include an email application that performs one or more operations on the computing system 302 and includes an email account associated with an organizational record (e.g., an employee record including the name of an employee, an email access identifier, and an email passcode) that is stored as part of the organizational data 311. In an example, a user associated with any computing system 302, 306, 310 can use a portion of the organizational data 311 associated with their employee record to access a corresponding account associated with one or more of application 304, application 308, and/or application(s) 312.

In an embodiment, the computing system 310 includes one or more application(s) 312 that can perform one or more operations on the computing system 310 and can communicate data and/or information with any one or more computing systems, including the computing system 302 and/or the computing system 306, or any one or more computing devices. The application(s) 312 can, for example, include an employee management application that operates on the computing system 310 and accesses the organizational data 311, which can include one or more organizational records associated with the names of organization employees and the respective employment statuses for each of the employees (e.g., an employee's position or role within the organization, an organizational department associated with the employee, etc.). A user (e.g., a privileged user, such as a manager or administrator with the authority to access and/or modify the organizational data 311) associated with the computing system 306 can, for example, access and/or modify the organizational data 311 to reflect when an employee receives a promotion or a raise, changes to a different department, is added to one or more new teams, etc.

The one or more application(s) 312 can perform one or more operations on the computing system 310 and can communicate data and/or information with one or more computing systems, including the computing system 302 and/or the computing system 306, or any one or more computing devices. The application(s) 312 can, for example, include an administrative or other type of system application to manage one or more aspects of the application(s) 312 including, but not limited to, installing, configuring, maintaining, updating, integrating, automating and/or performing one or more other operations associated with the application(s) 312 on the computing system 310 and that can manage one or more aspects of one or more other applications on different systems and devices, which may include the application 304 and/or the application 308.

In some embodiments, the application(s) 312 can include one or more third-party applications that are stored and/or perform operations on the computing system 310. Further, the application(s) 312 can retrieve data and/or information associated with and/or operate in cooperation with applications external to the computing system 310 (e.g., the computing system 302 and/or the computing system 306). The application(s) 312 can also use (e.g., access, modify, and/or control) the organizational data 311. For example, the application(s) 312 can use the organizational data 311 that is associated with the application 304 to perform one or more operations using the application 308 that is on the computing system 306.

The computing system 310 includes the application policy data 313 which can be implemented on the computing system 310 and can be used to perform one or more operations associated with implementing an application policy associated with the organizational data 311 and/or one or more applications including the application 304, the application 308, and/or application(s) 312. The application 304, the application 308, and/or application(s) 312 can include one or more third-party applications that are separate from, that are operated separate and apart from, and that are not affiliated with the organization that manages, owns, controls and/or maintains the organizational data 311 or an associated organizational data management application on the computing system 310, and/or that determines or implements an application policy associated with the application policy data 313. In one example, third-party applications can be differentiated from organizational applications that, for example, are inherent to, are a part of, or otherwise operate directly or as part of an organizational data management application, system, services, or platform.

The application policy data 313 can include one or more rules that determine how one or more applications including, for example, one or more third-party applications or organizational applications are accessed, modified, and/or controlled. For example, the application policy data 313 can use the organizational data 311 that is associated with the application(s) 304 to perform one or more operations on the application(s) 312 and/or the application 308. Also, the application policy data 313 can use the organizational data 311 that is associated with the application(s) 312 to perform one or more operations on the application 304 and/or the application 308. By way of further example, the application policy data 313 can use the organizational data 311 that is associated with the application 308 to perform one or more operations on the application 304 and/or the application(s) 312. In some embodiments, the application policy data 313 can determine how a combination of one or more organizational applications (e.g., applications owned and controlled by an organization that owns and controls the organizational data 311 and/or applications provided with or as part of an organizational data management system used by the organization as the system of record for maintaining the organizational data 311, etc.) and/or one or more third-party applications are accessed, modified, configured, and/or controlled.

The computing system 310 includes the integration data 314, which can reside on the computing system 310 and can be used, for example, to perform one or more operations that integrate the organizational data 311 and associated activities based on the organizational data 311 across one or more different computing systems (e.g., such as computing systems 302, 306, and 310) and/or applications (e.g., such as applications 304, 308, and 312). For example, the integration data 314 can be used to integrate and synchronize organizational data 311 and/or associated operations across an organizational data management application or system (e.g., a system of record for organization data 311) and each of one or more separate third-party applications that utilize organizational data 311 and/or perform operations based on organizational data 311.

In an embodiment, the integration data 314 can include configuration information associated with integrating and synchronizing data among one or more computing systems and/or applications. For example, the integration data 314 can include information that enables integration between an organizational application (e.g., an application 312 associated with an organizational data management system of record for the organizational data 311) and each of one or more separate third-party applications (e.g., application 304, 308) that use or perform operations based on the organizational data 311). Such integration data 314 may include, but is not limited to, information indicating and/or describing various data that enables performance of an integration between applications or systems, such as an integration type information (e.g., flat file, application programming interface (API), webhook, system call, etc.), security information (e.g., authentication information, encryption information, etc.) technical information (e.g., file locations, call information, system naming, application naming, Internet Protocol (IP) address information, port information, etc.), integration flow information (e.g., "push," "pull," bidirectional, etc.), integration activation (e.g., scheduling or timing information, event information, one or more rules, one or more triggering conditions or criteria, etc.), processing information (e.g., data mappings between the source and target, data validation rules, data transformations, error handling, etc.), and/or any other information used in defining, configuring, and/or integrating an application with each of any number of third-party applications and/or systems.

The computing system 310 includes the data structures 315, which can be implemented on the computing system 310 and used to perform operations involving the organizational data 311 including, but not limited to, performing integration and synchronization of the organizational data 311 with one or more different third-party applications and/or systems. In an embodiment, the data structures 315 generally can include information about the properties or attributes of each of one or more entities associated with the organizational data 311. Data structures 315 also can include information describing relationships associated with one or more entities associated with the organizational data 311. In some embodiments, the data structures 315 generally can be used in validating and processing the organizational data 311 and/or other information received from third-party applications and/or systems. The data structures 315 also can be used in association with performing or otherwise carrying out one or more operations involving the organizational data 311 including, but not limited to, processing requests, validating queries, generating workflows, executing workflows, creating reports, running reports, etc.

In an embodiment, the data structures 315 can include one or more object graphs that provide information about entities, relationships, rules, constraints, and/or any other aspects of managing the organizational data 311. For example, such object graphs can include one or more nodes representing entities associated with the organizational data 311 and one or more edges that connect and represent relationships between the nodes. The data structures 315 can also include organizational data and/or associated metadata.

In addition, the data structures 315, together or alone, generally may represent one or more aspects of an application or system (e.g., such as an organizational data management system that is a system of record for organizational data 311 of an organization).

In an embodiment, the application store computing system 320 provides an organization with access to multiple different integration applications 330 for integrating organizational data 311 and/or associated processes with and across various different applications and/or systems (e.g., such as third-party applications and/or systems). Application store computing system 320 also may provide an organization with one or more other types of applications, including but not limited to, platform utility apps 360 that provide additional functionality to an organizational data management application or system, other apps 362 that may include integration-related applications, and/or any other types of applications. Generally, the application store computing system 320 may provide one or more various applications for a flat fee, based on a subscription purchase, for a fee based on usage, for a fee based on a number of users, computing systems, processors, or any other criteria, as part of a limited trial, for free, and/or generally under any type of arrangement. In an embodiment, the application store computing system 320 is managed and provided by the same party that provides an organizational data management system to organizations. For example, the integration applications 330 provided by the application store computing system 320 generally may be specialized for use with the organizational data management system (e.g., and not end-user versions of applications that would be installed for general purpose use by end-users on end-user devices).

In an embodiment, the integration applications 330 generally can be any application that allows an organization to manage any one or more aspects associated with providing one or more corresponding end-user applications to individual members, teams, roles, departments, and/or any other grouping or categorization of individuals in an organization. For example, each of the integration applications 330 can be used by an organization to control and automate various tasks associated with provisioning, configuring, maintaining, and integrating third-party applications. In some embodiments, one or more of the integration applications 330 can allow an organization to configure automated assignment of a corresponding end-user application to one or more individuals, user account creation, single sign-on setup, provisioning, installation, setup, and/or maintenance of corresponding end-user applications (e.g., third-party applications or other applications provided for use by end users) provided to particular individuals, groups, and/or one or more devices associated with such individuals or groups in the organization.

In an embodiment, one or more of the integration applications 330 can provide integration of organizational data 311 and associated services across third-party applications or computing systems and one or more applications or computing systems of an organization associated with organizational data 311. For example, each of the integration applications 330 can provide one or more of user account creation, single sign-on integration, user account suspension or removal, user management, group management, user privileges, user data access, user data control, template management, data integration, process automation, and/or any other types of integration between applications (e.g., third-party applications or other applications) that are associated with organizational data 311 of an organization.

In an embodiment, the integration applications 330 and/or other applications provided by the application store computing system 320 may include, but are not limited to, collaboration apps 340, support apps 342, design apps 344, development apps 346, finance and legal apps 348, human resources (HR) and benefits apps 350, information technology (IT), device management, and security apps 352, office management apps 354, sales and marketing apps 356, charitable apps 358, platform utility apps 360, and/or other apps 362. Generally, various different types of applications provided by the application computing system 320 may be organized, categorized, grouped, presented, and/or otherwise offered in any type of arrangement, and thus are not limited to any particular examples discussed herein, which are provided for illustration purposes only.

In an embodiment, collaboration apps 340 may include, for example, any applications that provide scheduling, communications, document sharing and management, electronic signature services, project management, productivity, and/or any other types of applications that facilitate work between individuals, groups, and/or parties.

In an embodiment, support apps 342 may include, for example, any applications that provide services associated with customer support, technical support, issue reporting, issue management and escalation, tracking and managing help desk tickets, and/or any other types of applications that facilitate customer, business, and/or technology support.

In an embodiment, design apps 344 may include, for example, any applications that provide services associated with creating graphic designs, product designs, prototypes, drawings, graphical user interfaces, user experiences, and/or any other types of applications that facilitate the creation of designs, interfaces, and/or artistic works.

In an embodiment, development apps 346 may include, for example, any applications that provide services associated with software development, software testing, source code control and management, source code scanning, application testing, process automation, cloud hosting and services, system monitoring, error reporting and alerts, machine learning, and/or any other types of applications that facilitate activities associated with building, maintaining, or deploying software applications.

In an embodiment, finance, operational, and legal apps 348 may include, for example, any applications that provide services associated with accounting systems, budgeting systems, vendor management systems, payment systems, travel systems, expense management systems, supply chain systems, manufacturing systems, compliance and governance systems, vendor management systems, contract management systems, and/or any other types of applications and/or systems used to manage various aspects of an organization.

In an embodiment, human resources (HR) and benefits apps 350 may include, for example, any applications that provide services associated with recruiting and hiring, temporary staffing, background checks, payroll and benefits, training and onboarding, retirement planning and contributions, reward and bonus programs, employee training, learning management systems, performance management, time and attendance, and/or systems any other types of applications or systems associated with employee-related activities.

In an embodiment, information technology (IT), device management, and security apps 352 may include, for example, any applications that provide services associated with device management, technology, information security, password management, and/or any activities associated with managing applications, systems, devices, or associated technology.

In an embodiment, office management apps 354 may include, for example, any applications that provide services associated with facilities management, receptionist services, physical access, visitor access, catering services, office layout, office assignments, and or any other types of applications or systems associated with performing office management.

In an embodiment, sales and marketing apps 356 may include, for example, any applications that provide services associated with social media, analytics, advertising, event management, customer relationship management, content creation and distribution, public relations, business generation, campaign management, and/or any other types of similar or related activities.

In an embodiment, charitable apps 358 may include, for example, any applications that provide services associated with donations, charitable giving, crowdfunding, etc.

In an embodiment, platform utility apps 360 may include, for example, any applications from a provider that allow an organization to utilize software applications, systems, or services that have been purchased or that are otherwise available from the provider. For example, a provider of an organizational data management system can allow an organization to access and utilize standard services and/or enhanced services one or more of the platform utility apps 360. In some embodiments, the platform utility apps 360 operate from and/or are directly integrated with applications, systems, and/or services obtained from a provider. For example, such platform utility apps 360 can allow one or more users of an organization to customize a particular implementation or instance of provider software that is associated with the organization. In one example, one of the platform utility apps 360 can allow the creation and/or modification of one or more custom fields in association with one or more entities, the creation and/or modification of one or more relationships among the entities, the creation and/or modification of one or more default system rules or custom rules, the addition and/or use of custom fields, custom relationships and/or custom rules in various workflow tasks, reports, integrations, etc.

In an embodiment, other apps 362 may include, for example, any types of applications that may be used by individuals and/or organizations. The other apps 362 may include, for example, any other category of integration applications 330 and/or any other types of applications that can be executed by a computing system or device.

In an embodiment, authorized users of an organization with the appropriate privileges may access one or more services of the application store computing system 320 directly, for example, via a website, web page, desktop application, mobile application, and/or any other type of application to browse, view, search, compare, evaluate, download, install, configure, upgrade, uninstall, and/or perform any other types of activities associated with the integration applications 330 or any other types of applications provided via the application store computing system 320. In some embodiments, authorized users of an organization with the appropriate privileges may access one or more services of the application store computing system 320 indirectly, for example, through another application (e.g., application 312) and/or another computing system (e.g., computing system 310). In some embodiments, the application store computing system 320 can be provided on the same computing system with other applications and services (e.g., running on computing system 310).

In an embodiment, any one or more users of an organization, such as an administrator, manager, or one or more other users associated with a particular role and/or one or more particular privileges each may install and/or configure each of one or more different integration applications 330 for use by the organization. For example, any such user with the appropriate privileges may install one or more of the integration applications 330 for the organization on the computing system 310 or any other computing systems or devices. Also, any such user with the appropriate privileges may configure integration data 314 associated with each of one or more integration applications 330. In some embodiments, one user with the appropriate privileges may delegate authority to one or more other users to perform installation and/or configuration of one or more of the integration applications for an organization.

In an embodiment, an organizational data management system is provided via at least one computing system to allow each of one or more different organizations to centrally manage their own organizational data 311. For example, the organizational data management system can be provided as a centralized system of record for storing and managing various types of organizational data 311 of an organization. The organizational data management system also can provide various types of integration across different third-party applications that utilize, that perform processing involving or based on, and/or that are otherwise associated with organizational data 311. The organizational data management system also can automate various processing based on the organizational data 311 including, but not limited to the automation of processing performed across various third-party applications based on the organizational data. In various embodiments, the organizational data management system can be provided via one or more different computing systems, one or more different applications, and/or via one or more different services, for example, to one or more different organizations over a computer network.

In an embodiment, a separate instance of an organizational data management system generally can be provided to each of one or more different organizations, for example to allow each organization to independently configure, manage, and integrate their own instance of an organizational data management system, and to secure and insulate organizational data 311 from outside parties. For example, separate instances of an organizational data management system generally may be provided to different organizations using different computer hardware devices, different software applications, different instances of software applications running in an isolated space, different databases, physically partitioned databases, and/or in various other ways.

In an embodiment, an organizational data management system generally enables organizations to efficiently manage organizational data 311 and associated processing that occurs based on the organizational data 311. For example, an organizational data management system may be used as a centralized system of record that is integrated with other computing systems and applications (e.g., third-party applications) that generate, utilize, process, or perform activities based on organizational data 311. Such integration generally allows an organizational data management system to orchestrate and automate processing of organizational data 311 and associated activities across numerous different applications that are not in communication with one another. In some embodiments, an organizational data management system can allow appropriate users (e.g., authenticated, authorized, privileged, etc.) of an organization to, for example, manage organization information, settings of an organizational data management system, onboarding of employees, offboarding of employees, employee information, organizational structure and locations, employee placement in departments and teams, workflows and tasks, reports, documents, and/or any other information associated with organizational data 311.

Figure 4:
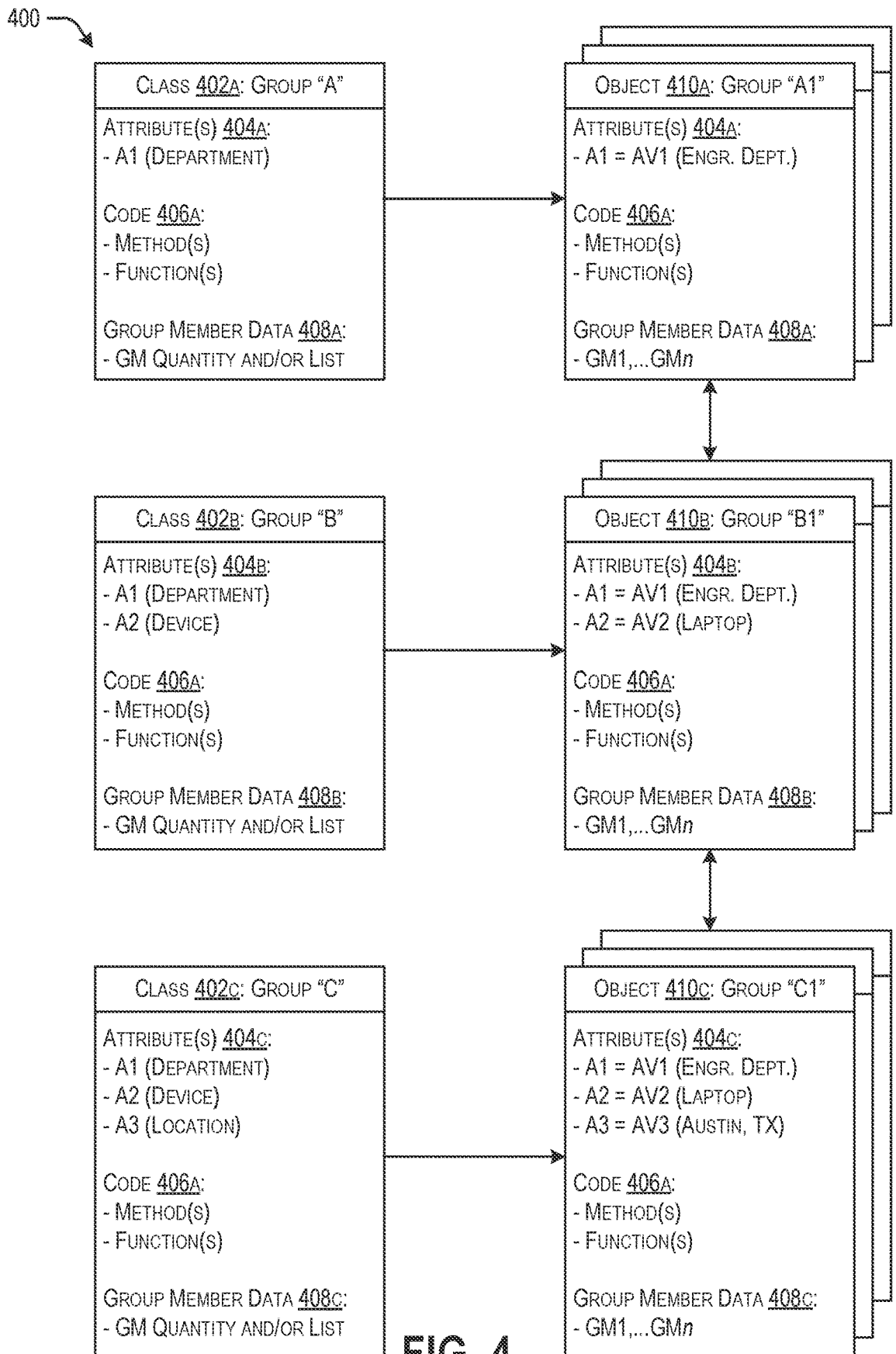
FIG. 4 illustrates a diagram of an example, non-limiting object graph subset according to one or more example embodiments of the present disclosure.

FIG. 4 illustrates a diagram of an example, non-limiting object graph subset 400 according to one or more example embodiments of the present disclosure. In the example embodiment depicted in FIG. 4, object graph subset 400 can include one or more group classes 402a, 402b, 402c (respectively denoted as "Class 402a: Group 'A'," "Class 402b: Group 'B'," and "Class 402c: Group 'C'" in FIG. 4) that can be instantiated (e.g., executed, run, implemented) to generate one or more group objects 410a, 410b, 410c (respectively denoted as "Object 410a: Group 'A1'," "Object 410b: Group 'B1'," and "Object 410c: Group 'C1'" in FIG. 4).

In the example embodiment depicted in FIG. 4, each group object 410a, 410b, 410c can respectively correspond to and/or represent a certain group that can be associated with, for instance, an organization (e.g., enterprise, non-profit organization). For example, in this embodiment: group object 410a can correspond to and/or represent a group of employees working in an "Engineering Department" of the organization; group object 410b can correspond to and/or represent a group of employees working in an "Engineering Department" of the organization that have been issued at least one "Laptop"; and/or group object 410c can correspond to and/or represent a group of employees working in an "Engineering Department" of the organization that have been issued at least one "Laptop" and work at an office of the organization located in "Austin, TX".

In the embodiment depicted in FIG. 4, a computing system (e.g., computing system 110, computing device(s) 112, remote computing system 130, computing device(s) 132, computing device(s) 152, computing device 200, computing system 302, computing system 306, computing system 310) can create and/or define (e.g., using an object-oriented or object-based programming language and/or functionality (e.g., encapsulation, abstraction, polymorphism, inheritance) as described above) group classes 402a, 402b, 402c. In this embodiment, the computing system can create and/or define group classes 402a, 402b, 402c such that they respectively include: one or more attributes 404a, 404b, 404c (respectively denoted as "A1 (Department)," "A2 (Device)," and "A3 (Location)" in FIG. 4); code 406a, 406b, 406c (e.g., the above described code that can be in the form of, for instance, method(s) and/or function(s) and/or which can include the above-described dependency mapping file and/or indemnity condition); and/or a data field for group member data 408a, 408b, 408c, which can constitute and/or include, for instance, a group member (GM) quantity and/or list (e.g., list of group members and/or group member identifiers) that can be respectively populated in group objects 410a, 410b, 410c.

In the embodiment depicted in FIG. 4, the computing system can respectively instantiate (e.g., execute, implement, and/or run using an object-oriented or object-based programming language and/or functionality (e.g., encapsulation, abstraction, polymorphism, inheritance) as described above) each group class 402a, 402b, 402c to generate group objects 410a, 410b, 410c (e.g., respective instance(s) of group classes 402a, 402b, 402c) such that each group object 410a, 410b, 410c includes: one or more attribute value fields that can each be populated with an attribute value AV1, AV2, AV3 (respectively denoted as "Engineering Department," "Laptop," and "Austin, TX" in FIG. 4) and respectively correspond to attributes 404a, 404b, 404c (respectively denoted as "A1," "A2," and "A3" in FIG. 4) of group classes 402a, 402b, 402c; code 406a, 406b, 406c (e.g., the above described code that can be in the form of, for instance, method(s) and/or function(s) and/or which can include the above-described dependency mapping file and/or indemnity condition); and/or a group member (GM) quantity and/or list (e.g., list of group members and/or group member identifiers denoted as "GM1, . . . GMn" in FIG. 4, where "n" represents the total quantity of group members).

In the embodiment depicted in FIG. 4, each of the attribute values "Engineering Department," "Laptop," and "Austin, TX" can be used to respectively define (e.g., configure), at least partly, each group object 410a, 410b, 410c and/or to respectively define (e.g., specify), at least partly, the membership criterion or criteria for being a group member of each group object 410a, 410b, 410c. For example, in this embodiment, each current group member and/or each incoming new group member of group object 410c (Group "C1) can have (e.g., possess), correspond to, and/or be associated with each attribute value "Engineering Department," "Laptop," and "Austin, TX".

The example embodiment depicted in FIG. 4 illustrates one example embodiment of how a computing system (e.g., computing system 110) of the present disclosure can create, define, and/or instantiate different group classes (e.g., Group "A," Group "B," Group "C" in FIG. 4) to generate different group objects (e.g., Group "A1," Group "B1," Group "C1" in FIG. 4) that can communicate and/or interact with one another as described in example embodiments of the present disclosure. For example, group objects 410a, 410b, 410c can communicate and/or interact with one another as described herein to update and/or refresh their respective memberships (e.g., add and/or remove current and/or incoming new group members) based at least in part on (e.g., in response to) obtaining data (e.g., a notification) indicative of a change to an attribute value with respect to an entity associated with group object 410a, 410b, and/or 410c. For instance, in this embodiment, if the attribute value "Engineering Department" changes with respect to (e.g., as the change relates to) a current group member and/or an incoming new group member of group object 410c, a computing system described herein (e.g., computing system 110) and/or group object 410c can communicate such a change to group object 410a and/or group object 410b. In this embodiment, upon receiving such communication, group object 410a and/or group object 410b can respectively update their memberships based on such an attribute value change.

In the example embodiment depicted in FIG. 4, a computing system described herein (e.g., computing system 110) can respectively instantiate group classes 402a, 402b, 402c multiple times to generate group objects 410a, 410b, 410c and/or one or more additional group objects as illustrated in FIG. 4. For instance, although not annotated in the example embodiment depicted in FIG. 4, in some embodiments, such a computing system can instantiate group class 402a multiple times such that each group object instance generated therefrom can be populated with a different department for the AV1 attribute value field. For example, in one embodiment, the computing system can instantiate group class 402a to generate a group object instance that can be denoted as "Group 'A2'" and can be populated with a "Sales Department" attribute value for the AV1 attribute value field. As such, the computing system according to example embodiments described herein can generate any number of different group objects using any number of different combinations of different attribute values to represent any number of different groups that respectively correspond to such different group objects. It should be appreciated that the example embodiment depicted in FIG. 4 is only one illustrative example of group objects that can be generated by the computing system.

Figure 5:
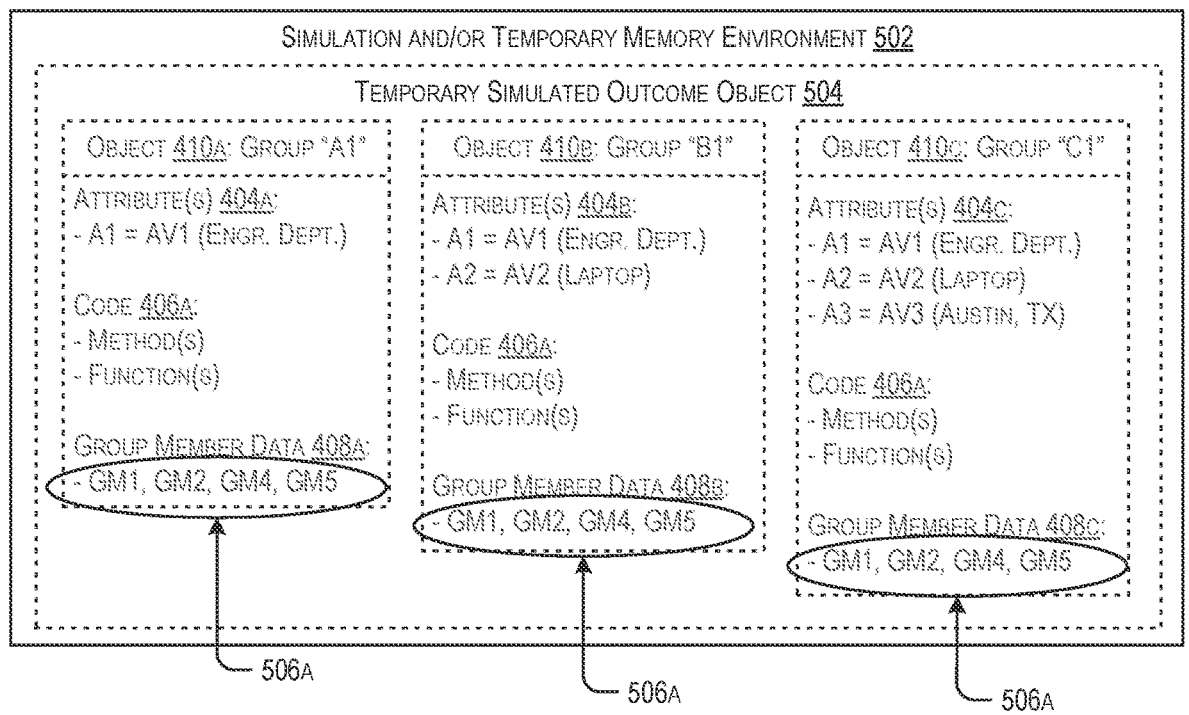
FIG. 5 illustrates an example, non-limiting simulation diagram according to one or more example embodiments of the present disclosure.
Figure 5:
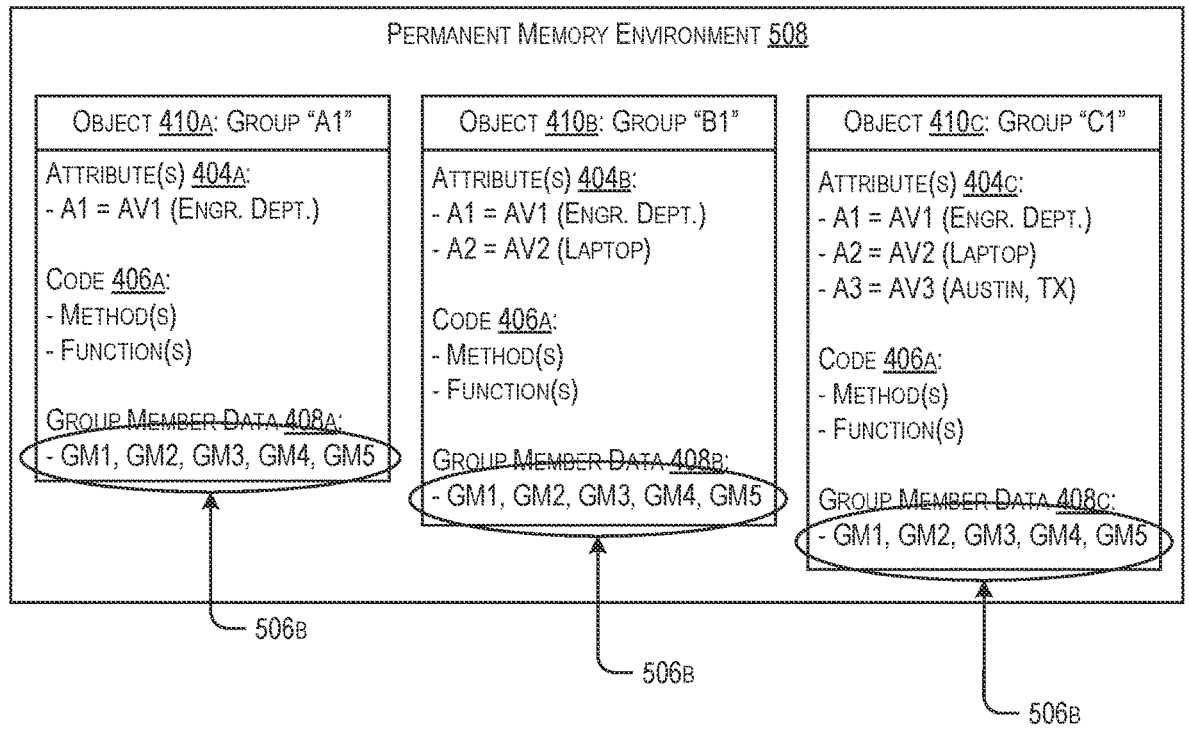

FIG. 5 illustrates an example, non-limiting simulation diagram 500 according to one or more example embodiments of the present disclosure. In the example embodiment depicted in FIG. 5, simulation diagram 500 provides an example illustration of how a potential change to an attribute value with respect to an entity associated with one or more group objects can be simulated and/or stored in a simulation and/or temporary memory environment 502 without implementing any membership updates to such group object(s) in a permanent memory environment 508.

In the example embodiment depicted in FIG. 5, simulation and/or temporary memory environment 502 can constitute and/or include, for instance, a volatile memory, a cache memory, and/or another temporary memory that can be coupled to a computing system described herein according to example embodiments (e.g., computing system 110, computing device(s) 112, remote computing system 130, computing device(s) 132, computing device(s) 152, computing device 200, computing system 302, computing system 306, computing system 310). In this embodiment, permanent memory environment 508 can constitute and/or include, for instance, a non-volatile memory, a database, and/or another permanent memory (e.g., memory device(s) 116, memory device(s) 136, memory device(s) 156, memory device(s) 202) that can be coupled to such a computing system described herein according to example embodiments.

In the example embodiment depicted in FIG. 5, a computing system (e.g., computing system 110, computing device(s) 112, remote computing system 130, computing device(s) 132, computing device(s) 152, computing device 200, computing system 302, computing system 306, computing system 310) can simulate (e.g., using the above-described indemnity condition and/or dependency mapping file) a potential change to, for instance, the "Engineering Department" attribute value with respect to a certain current group member denoted as "GM3" in FIG. 4 of each group object 410a, 410b, 410c. For instance, in this embodiment, the computing system can simulate the potential transfer of GM3 to a "Sales Department."

In the example embodiment depicted in FIG. 5, in simulating such a potential transfer of GM3 to a "Sales Department," the computing system can determine that if the transfer were to be implemented at some time in the future it would affect the membership of GM3 with respect to each group object 410a, 410b, 410c. For instance, as illustrated by group member list 506a depicted in FIG. 4, such a potential change of the "Engineering Department" attribute value with respect to GM3 would, if implemented, result in GM3 being removed from each group object 410a, 410b, 410c. In this embodiment, the computing system can simulate such a potential removal of GM3 from each group object 410a, 410b, 410c by removing GM3 from each group object 410a, 410b, 410c as illustrated group member list 506a and temporarily saving such changes to group object 410a, 410b, 410c in simulation and/or temporary memory environment 502. In this embodiment, such temporarily stored changes to each group object 410a, 410b, 410c are reflected and/or represented by the dashed rectangles forming each group object 410a, 410b, 410c in simulation and/or temporary memory environment 502.

In the example embodiment depicted in FIG. 5, the computing system can temporarily store such temporarily changed group objects 410a, 410b, 410c in a temporary simulated outcome object 504, which can be generated by the computing system as described herein (e.g., using an object-oriented or object-based programming language and/or functionality (e.g., encapsulation, abstraction, polymorphism, inheritance)). In this embodiment, temporary simulated outcome object 504 is depicted in FIG. 5 as a dashed rectangle to reflect and/or represent its temporary nature and/or the above-described temporary operations that can be performed on each group object 410a, 410b, 410c.

In some embodiments, the computing system can present (e.g., render, display using a GUI) temporary simulated outcome object 504, the temporarily changed group objects 410a, 410b, 410c, and/or group member list 506a to a user that can implement the computing system to simulate such a potential attribute value change with respect to GM3. In some embodiments, temporary simulated outcome object 504, the temporarily changed group objects 410a, 410b, 410c, and/or group member list 506a can constitute and/or include temporary dataset(s) that can be temporarily generated and/or used to facilitate the above-described potential attribute value change simulation and then deleted by the computing system (e.g., upon receipt of user input data indicative of instructions for the computing system to perform such deletion).

In the example embodiment depicted in FIG. 5, the computing system can simulate the above-described potential change of the "Engineering Department" attribute value with respect to GM3 without actually updating, refreshing, and/or saving the above-described potential group membership changes to each group object 410a, 410b, 410c that would occur if and/or when the potential attribute value change were to be implemented at some time in the future. For example, in this embodiment, as illustrated by group member list 506b, the computing system can simulate such a potential change of the "Engineering Department" attribute value with respect to GM3 without actually updating, refreshing, and/or permanently saving the potential removal of GM3 from each group object 410a, 410b, 410c in permanent memory environment 508.

In some embodiments, the computing system can receive input data (e.g., from a user, via a GUI) that can be indicative of instructions for the computing system to implement the above-described attribute value change with respect to GM3. In these embodiments, based at least in part on (e.g., in response to) receiving such input data, the computing system can implement such a change and thereafter update, refresh, and/or permanently save each revised group object 410a, 410b, 410c in permanent memory environment 508 such that each revised group object 410a, 410b, 410c reflects the removal of GM3 from each of such group objects.

Figure 6A:
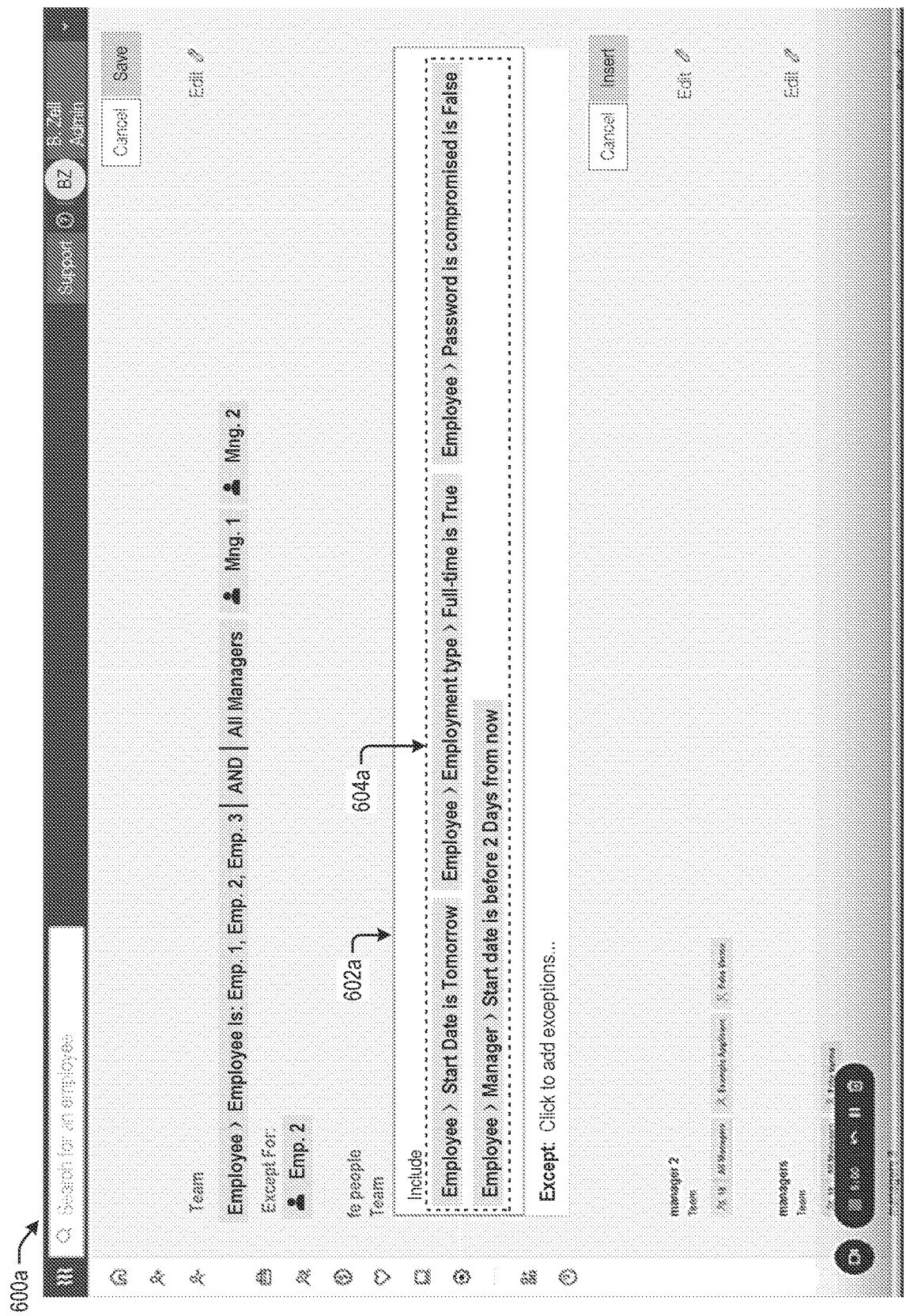
FIGS. 6A and 6B each depict an example, non-limiting graphical user interface that can be generated and/or implemented in accordance with one or more example embodiments of the present disclosure.
Figure 6B:
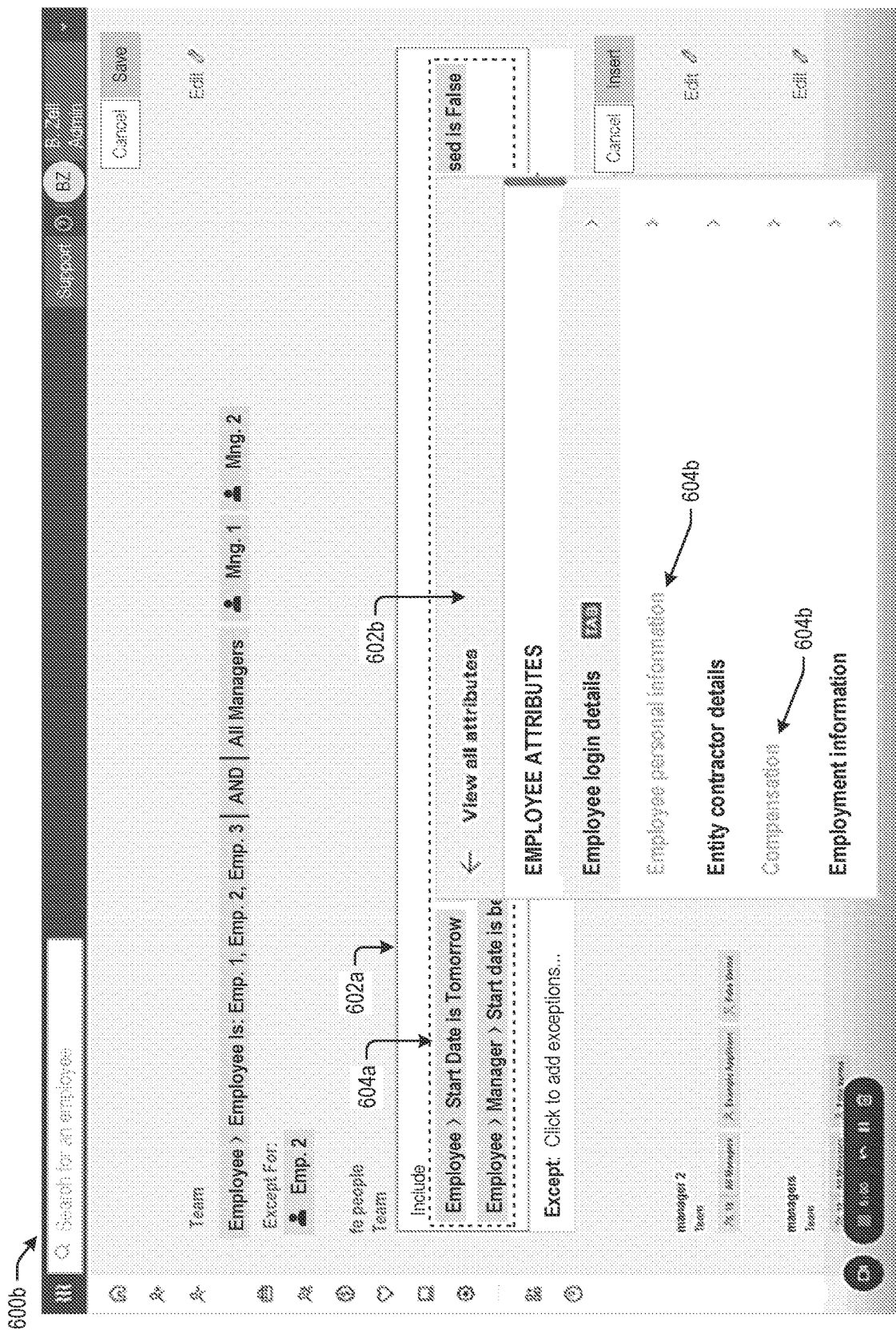

FIGS. 6A and 6B depict example, non-limiting graphical user interfaces 600a and 600b, respectively, that can be generated and/or implemented (e.g., by computing system 110) in accordance with one or more example embodiments of the present disclosure. In at least one embodiment described herein, computing system 110 can generate and/or provide (e.g., via network 102) graphical user interface 600a and/or 600b to one or more computing systems and/or devices described herein such as, for instance, computing device(s) 112, remote computing system 130, computing device(s) 132, computing device(s) 152, computing device 200, computing system 302, computing system 306, computing system 310, application store computing system 320, and/or another computing system or device. In this embodiment, computing system 110 can generate and/or provide (e.g., via network 102) graphical user interface 600a and/or 600b to such computing system(s) and/or device(s) such that an entity (e.g., a user, a human) implementing (e.g., using) one or more of these computing system(s) and/or device(s) can view and/or interface with graphical user interface 600a and/or 600b (e.g., via input device(s) 122, output device(s) 124, output device(s) 226, input device(s) 230).

FIG. 6A depicts an example, non-limiting graphical user interface 600a having an input element 602a that can receive one or more query language formulas 604a. In the example embodiment depicted in FIG. 6A, such one or more query language formulas 604a can constitute, include, and/or be in the form of one or more attributes and/or attribute values that can be respectively possessed by, correspond to, and/or be associated with any number of entities (e.g., employee, department, location, team, event) associated with, for instance, an organization (e.g., enterprise, non-profit organization). For instance, in this embodiment, such attribute(s), attribute value(s), and/or query language formula(s) 604a can correspond to one or more employees and/or one or more managers of each of such employee(s). For example, as illustrated in the example embodiment depicted in FIG. 6A, such attribute(s), attribute value(s), and/or query language formula(s) 604a can include, but are not limited to: employee(s) having a start date of tomorrow; employee(s) having an employment type that is full-time; employee(s) having a password that is not compromised; and/or employee(s) having a manager that has a start date that is before 2 days from now.

In the example embodiment depicted in FIG. 6A, a user implementing a computing system described herein (e.g., computing system 110) can select (e.g., from a drop-down menu 602b illustrated in FIG. 6B) such attribute(s) and/or attribute value(s) to formulate query language formula(s) 604a in input element 602a. In this embodiment, based at least in part on (e.g., in response to) receiving (e.g., via input element 602a) such attribute(s), attribute value(s), and/or query language formula(s) 604a, the computing system can create, define, and/or implement a group object based at least in part on (e.g., using) such attribute(s), attribute value(s), and/or query language formula(s) 604a as described herein in accordance with one or more example embodiments of the present disclosure (e.g., by using an object-oriented or object-based programming language and/or functionality (e.g., encapsulation, abstraction, polymorphism, inheritance) as described herein).

It should be appreciated that, in at least one embodiment, graphical user interface 600a and/or a computing system described herein (e.g., computing system 110) can allow a user to formulate relatively more complex and/or granular query language formula(s) 604a compared to existing systems, as such query language formula(s) 604a can include a relatively high number of different attributes and/or different attribute values respectively corresponding to a relatively high number of different entities and/or aspects associated with, for instance, an organization. In this embodiment, it should also be appreciated that graphical user interface 600a and/or such a computing system (e.g., computing system 110) can further allow a user to formulate relatively more complex and/or granular query language formula(s) 604a that can be used by the computing system to create, define, and/or implement group object(s) that can be relatively more complex and/or granular compared to those of existing systems.

FIG. 6B depicts an example, non-limiting graphical user interface 600b having input element 602a that can receive query language formula(s) 604a as described above with reference to the example embodiment depicted in FIG. 6A. In the example embodiment depicted in FIG. 6B, graphical user interface 600b can constitute an example, non-limiting alternative embodiment of graphical user interface 600a described above and illustrated in FIG. 6A.

In the example embodiment depicted in FIG. 6B, query language formula(s) 604a can be formulated from one or more attributes and/or attribute values that can be selected, for instance, by a user from drop-down menu 602b. In this embodiment, if a computing system described herein (e.g., computing system 110) determines that a certain user that is selecting such attribute(s) and/or attribute value(s) does not have permission (e.g., access or privilege rights) to view data (e.g., data values) corresponding to such attribute(s) and/or attribute value(s), the computing system can prevent the user from viewing and/or selecting such attribute(s) and/or attribute value(s). For example, in the example embodiment depicted in FIG. 6B, the computing system can prevent the user from clearly viewing and/or selecting attributes 604b (e.g., "Employee personal information" and/ or "Compensation") if the computing system determines that the user does not have permission to view data values that would be returned as the attribute values corresponding to such attributes 604b.

As illustrated in FIG. 6B, in at least this embodiment, the computing system can, for instance, render attributes 604b in blurred and/or gray font in drop-down menu 602b to indicate that such attributes 604b are not available for selection by the user. In this embodiment, the computing system can further prevent the user from saving such attributes 604b. For example, in this embodiment, if the user is able to by-pass the above-described safeguard that prevents the user from viewing and/or selecting attributes 604b corresponding to data the user does not have permission to view, the computing system (e.g., computing system 110) can also prevent such a user from saving (e.g., in a permanent memory environment and/or database coupled to the computing system) any of such attributes 604b that may have been selected by the user and/or any group object that may have been created (e.g., in a temporary memory environment) and/or at least partly defined using such attributes 604b. It should be appreciated that by preventing the user from clearly viewing, selecting, and/or saving attributes 604b, graphical user interface 600b, drop-down menu 602b, and/or the computing system (e.g., computing system 110) can thereby provide permissions-based safeguarding of any attribute(s) and/or attribute value(s) that correspond to certain data that can only be viewed and/or accessed by certain users.

Figure 7:
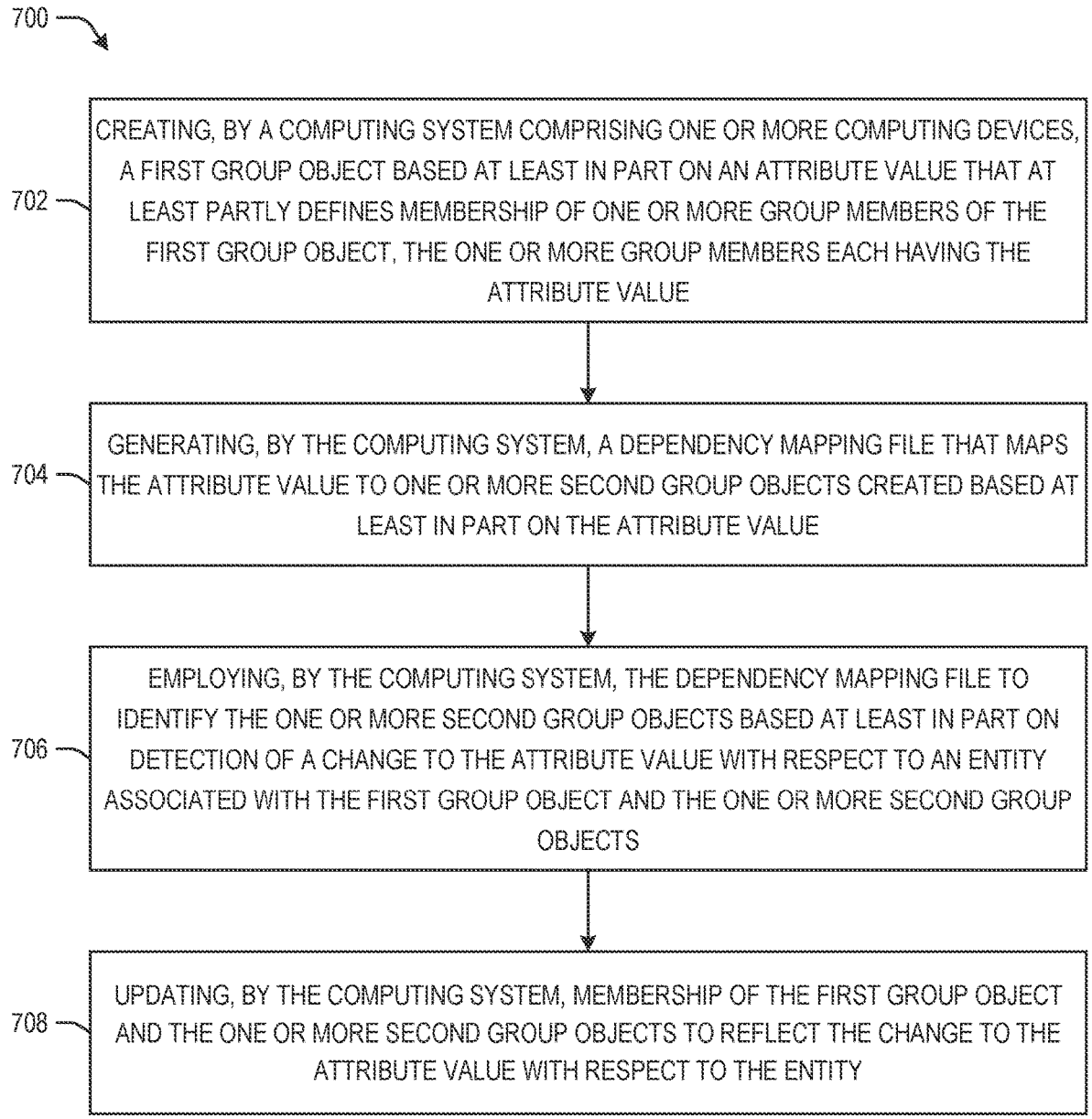
FIGS. 7 and 8 each depict a flow diagram of an example, non-limiting computer-implemented method according to one or more example embodiments of the present disclosure.

FIG. 7 depicts a flow diagram of an example, non-limiting computer-implemented method 700 according to one or more example embodiments of the present disclosure. One or more portions of computer-implemented method 700 can be executed and/or implemented on one or more computing devices or computing systems including, for example, computing system 110, computing device(s) 112, remote computing system 130, computing device(s) 132, computing device(s) 152, computing device 200, computing system 302, computing system 306, computing system 310, and/or application store computing system 320. Further, one or more portions of computer-implemented method 700 can be executed and/or implemented as an algorithm and/or as machine-readable instructions (e.g., computer software) on the hardware devices and/or systems disclosed herein. The example embodiment illustrated in FIG. 7 depicts operations performed in a particular order for purposes of illustration and discussion. Those of ordinary skill in the art, using the disclosures provided herein, will understand that various operations or steps of computer-implemented method 700 or any of the methods disclosed herein can be adapted, modified, rearranged, performed simultaneously, include operations not illustrated, omitted, expanded, and/or altered in various ways without deviating from the scope of the present disclosure.

At 702, computer-implemented method 700 can include creating (e.g., using an object-oriented or object-based programming language and/or functionality (e.g., encapsulation, abstraction, polymorphism, inheritance)), by a computing system (e.g., computing system 110) comprising one or more computing devices (e.g., computing device(s) 112), a first group object (e.g., group object 410a) based at least in part on (e.g., using) an attribute value (e.g., an "Engineering Department" attribute value) that at least partly defines membership of one or more group members (e.g., current and/or incoming new group member(s)) of the first group object, the one or more group members each having the attribute value.

At 704, computer-implemented method 700 can include generating, by the computing system, a dependency mapping file (e.g., the above-described dependency mapping file) that maps (e.g., associates) the attribute value to one or more second group objects (e.g., group object 410b and/or 410c) created based at least in part on (e.g., using) the attribute value.

At 706, computer-implemented method 700 can include employing (e.g., referencing, accessing, reading, analyzing, executing, running, implementing), by the computing system, the dependency mapping file to identify the one or more second group objects based at least in part on (e.g., in response to) detection of a change to the attribute value with respect to an entity (e.g., with respect to a current and/or incoming new group member) associated with the first group object and the one or more second group objects.

At 708, computer-implemented method 700 can include updating (e.g., refreshing and/or saving), by the computing system, membership of the first group object and the one or more second group objects to reflect the change to the attribute value with respect to the entity (e.g., updating each group object 410a, 410b, 410c to reflect the removal or addition of a current or incoming new group member, respectively).

Figure 8:
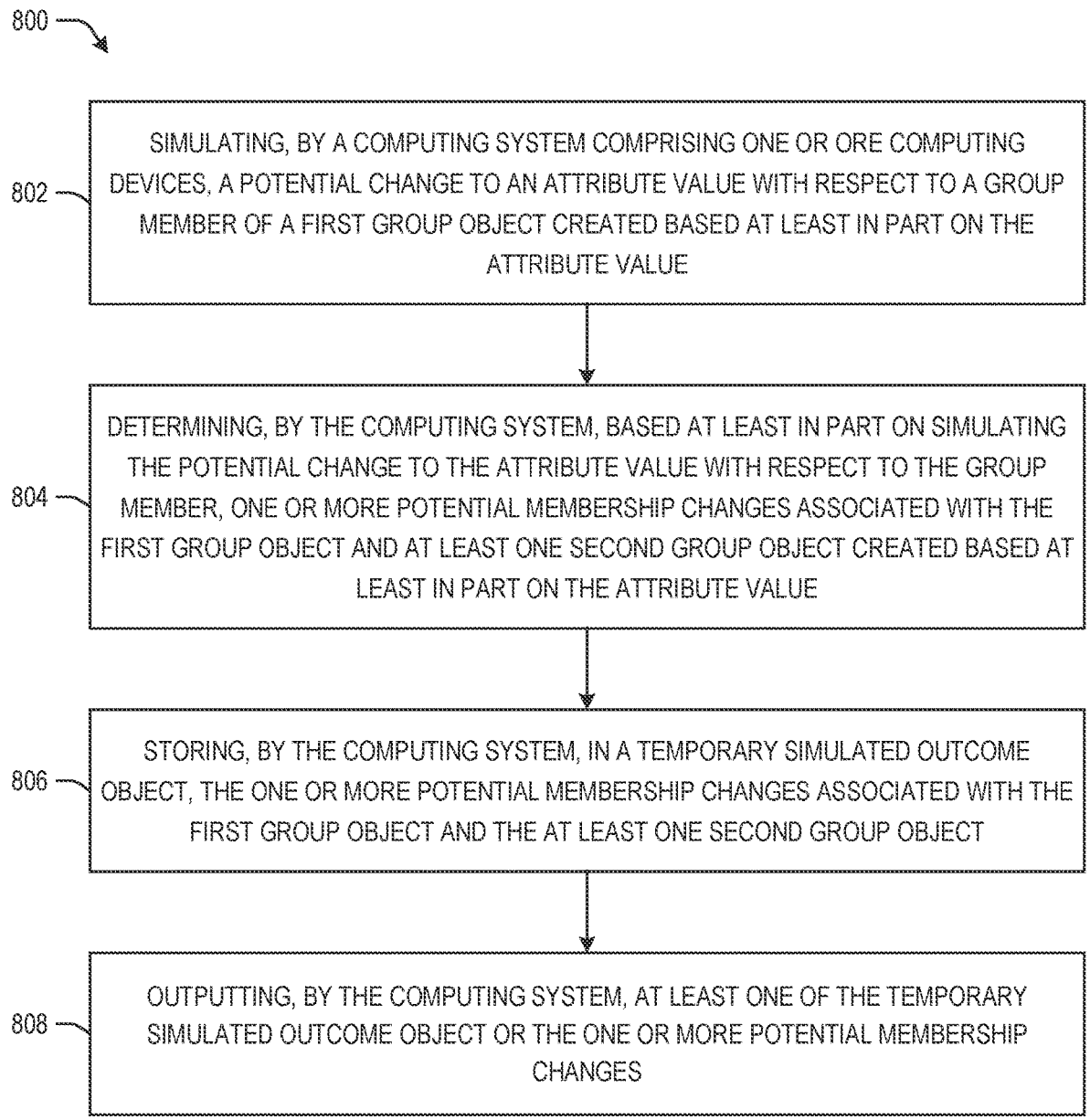

FIG. 8 depicts a flow diagram of an example, non-limiting computer-implemented method 800 according to one or more example embodiments of the present disclosure. One or more portions of computer-implemented method 800 can be executed and/or implemented on one or more computing devices or computing systems including, for example, computing system 110, computing device(s) 112, remote computing system 130, computing device(s) 132, computing device(s) 152, computing device 200, computing system 302, computing system 306, computing system 310, and/or application store computing system 320. Further, one or more portions of computer-implemented method 800 can be executed and/or implemented as an algorithm and/or as machine-readable instructions (e.g., computer software) on the hardware devices and/or systems disclosed herein. The example embodiment illustrated in FIG. 8 depicts operations performed in a particular order for purposes of illustration and discussion. Those of ordinary skill in the art, using the disclosures provided herein, will understand that various operations or steps of computer-implemented method 800 or any of the methods disclosed herein can be adapted, modified, rearranged, performed simultaneously, include operations not illustrated, omitted, expanded, and/or altered in various ways without deviating from the scope of the present disclosure.

At 802, computer-implemented method 800 can include simulating (e.g., in simulation and/or temporary memory environment 502 as described above with reference to the example embodiment depicted in FIG. 5), by a computing system (e.g., computing system 110) comprising one or more computing devices (e.g., computing device(s) 112), a potential change (e.g., a proposed change) to an attribute value (e.g., an "Engineering Department" attribute value) with respect to a group member (e.g., with respect to GM3 described above with reference to the example embodiment depicted in FIG. 5) of a first group object (e.g., group object 410a) created based at least in part on (e.g., using) the attribute value.

At 804, computer-implemented method 800 can include determining (e.g., using the above-described dependency mapping file), by the computing system, based at least in part on (e.g., in response to) simulating the potential change to the attribute value with respect to the group member, one or more potential membership changes (e.g., the simulated removal of GM3 from temporarily saved group object 410a, 410b, 410c as illustrated by group member list 506a described above with reference to FIG. 5) associated with the first group object and at least one second group object (e.g., group object 410b and/or 410c) created based at least in part on (e.g., using) the attribute value.

At 806, computer-implemented method 800 can include storing, by the computing system, in a temporary simulated outcome object (e.g., temporary simulated outcome object 504 described above with reference to the example embodiment depicted in FIG. 5), the one or more potential membership changes associated with the first group object and the at least one second group object (e.g., computing system 110 can store the temporarily changed group objects 410a, 410b, 410c that reflect the removal of GM3 in temporary simulated outcome object 504 as described above with reference to the example embodiment depicted in FIG. 5).

At 808, computer-implemented method 800 can include outputting, by the computing system, at least one of the temporary simulated outcome object or the one or more potential membership changes (e.g., computing system 110 can present (e.g., render, display using a GUI) temporary simulated outcome object 504, the temporarily changed group objects 410a, 410b, 410c, and/or group member list 506a to a user that can implement the computing system to simulate such a potential attribute value change with respect to GM3).

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, symbols, characters, terms, numbers, or the like.

These terms and similar terms can be associated with physical quantities and can represent labels applied to these quantities. The terms including "analyzing," "accessing,"

"determining," "identifying," "adjusting," "modifying," "transmitting," "receiving," "processing," "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer-readable storage medium (e.g., non-transitory computer-readable storage medium), which can include any type of storage. For example, the storage can include hard disk drives, solid state drives, floppy disks, optical disks, read-only memories (ROMs), compact disc read-only memories (CD-ROMs), magnetic-optical disks, random access memories (RAMs), programmable ROM (PROM), erasable PROMs (EPROMs), electrically erasable PROMs (EEPROMs), magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
    one or more processors; and
    one or more non-transitory computer-readable media that collectively store instructions that, when executed by the one or more processors, cause the computing system to perform one or more operations, the one or more operations comprising:
        creating a first group object based at least in part on an attribute value that at least partly defines membership of one or more group members of the first group object, the one or more group members each having the attribute value;
        generating a dependency mapping file that maps the attribute value to one or more second group objects created based at least in part on the attribute value;
        employing the dependency mapping file to identify the one or more second group objects based at least in part on detection of a change to the attribute value with respect to an entity associated with the first group object and the one or more second group objects; and
        updating membership of the first group object and the one or more second group objects to reflect the change to the attribute value with respect to the entity, wherein membership in the first group object is defined using a first query expressed in a query language, membership in the one or more second group objects is defined using one or more second queries expressed in the query language, and the first query and the one or more second queries each specify the attribute value; wherein
        evaluating membership in the first group object comprises traversing an object graph based on the first query; and
        evaluating membership in the one or more second group objects comprises traversing the object graph based on the one or more second queries.

2. The computing system of claim 1, wherein the entity is an existing group member or an incoming new group member of at least one of the first group object or the one or more second group objects.

3. The computing system of claim 1, wherein the one or more operations further comprise:
    creating a first group class using at least one of an object-oriented programming language or object-oriented programming functionality, the first group class comprising at least one of one or more attributes, the dependency mapping file, or an identifier corresponding to the dependency mapping file; and
    instantiating the first group class using at least one of the object-oriented programming language or the object-oriented programming functionality to create the first group object, the first group object comprising at least one of the attribute value, the dependency mapping file, or the identifier corresponding to the dependency mapping file, wherein the attribute value corresponds to one of the one or more attributes of the first group class.

4. The computing system of claim 1, wherein the one or more operations further comprise:
    presenting the attribute value to a user for selection to create the first group object based at least in part on determining that the user has permission to view data corresponding to the attribute value.

5. The computing system of claim 1, wherein the one or more operations further comprise:
    creating a condition based at least in part on the attribute value such that the condition depends on any change to the attribute value with respect to at least one of the entity, the one or more group members of the first group object, or one or more second group members of the one or more second group objects.

6. The computing system of claim 5, wherein at least one of the attribute value or the condition is defined by a user based at least in part on the user inputting one or more query language formulas into a user interface element of a user interface generated by the computing system.

7. The computing system of claim 1, wherein the one or more operations further comprise:
monitoring activity associated with an organizational management platform to detect one or more changes to the attribute value with respect to at least one of the entity, the one or more group members of the first group object, or one or more second group members of the one or more second group objects.

8. The computing system of claim 1, wherein the change to the attribute value with respect to the entity occurs in or is triggered by activity that occurs in at least one of an organizational management platform associated with the computing system, a first-party application of the organizational management platform, or a third-party application integrated into the organizational management platform.

9. The computing system of claim 1, wherein the one or more operations further comprise:
performing, using one or more first-party applications of an organizational management platform associated with the computing system, one or more first-party operations based at least in part on at least one of the change to the attribute value with respect to the entity or an updated version of at least one of the first group object or the one or more second group objects.

10. The computing system of claim 1, wherein the one or more operations further comprise:
causing one or more third-party operations to be performed by one or more third-party applications based at least in part on at least one of the change to the attribute value with respect to the entity or an updated version of at least one of the first group object or the one or more second group objects, wherein the one or more third-party applications are integrated into an organizational management platform associated with the computing system.

11. The computing system of claim 1, wherein at least one of the first query and the one or more second queries comprises a user-specified query.

12. The computing system of claim 1, wherein at least one of the first query and the one or more second queries specifies a combination of multiple different attribute values for multiple different attributes.

13. The computing system of claim 1, wherein the operations further comprise applying a rule or policy that is defined using a third query expressed in the query language, wherein the third query refers to at least one of the first group object and the one or more second group objects.

14. A computer-implemented method, comprising:
creating, by a computing system comprising one or more computing devices, a first group object based at least in part on an attribute value that at least partly defines membership of one or more group members of the first group object, the one or more group members each having the attribute value;
generating, by the computing system, a dependency mapping file that maps the attribute value to one or more second group objects created based at least in part on the attribute value;
employing, by the computing system, the dependency mapping file to identify the one or more second group objects based at least in part on detection of a change to the attribute value with respect to an entity associated with the first group object and the one or more second group objects; and
updating, by the computing system, membership of the first group object and the one or more second group objects to reflect the change to the attribute value with respect to the entity, wherein membership in the first group object is defined using a first query expressed in a query language, membership in the one or more second group objects is defined using one or more second queries expressed in the query language, and the first query and the one or more second queries each specify the attribute value; wherein
evaluating membership in the first group object comprises traversing an object graph based on the first query; and
evaluating membership in the one or more second group objects comprises traversing the object graph based on the one or more second queries.

15. The computer-implemented method of claim 14, further comprising:
presenting, by the computing system, the attribute value to a user for selection to create the first group object based at least in part on determining that the user has permission to view data corresponding to the attribute value.

16. The computer-implemented method of claim 14, further comprising:
creating, by the computing system, a condition based at least in part on the attribute value such that the condition depends on any change to the attribute value with respect to at least one of the entity, the one or more group members of the first group object, or one or more second group members of the one or more second group objects; and
monitoring, by the computing system, activity associated with an organizational management platform, one or more first-party applications of the organizational management platform, and one or more third-party applications integrated into the organizational management platform to detect one or more changes to the attribute value with respect to at least one of the entity, the one or more group members of the first group object, or the one or more second group members of the one or more second group objects.

17. The computer-implemented method of claim 14, further comprising:
performing, by the computing system, using one or more first-party applications of an organizational management platform associated with the computing system, one or more first-party operations based at least in part on at least one of the change to the attribute value with respect to the entity or an updated version of at least one of the first group object or the one or more second group objects.

18. The computer-implemented method of claim 14, further comprising:
causing, by the computing system, one or more third-party operations to be performed by one or more third-party applications based at least in part on at least one of the change to the attribute value with respect to the entity or an updated version of at least one of the first group object or the one or more second group objects, wherein the one or more third-party applications are integrated into an organizational management platform associated with the computing system.

* * * * *